US012794154B2

(12) United States Patent
Rossman et al.

(10) Patent No.: US 12,794,154 B2
(45) **Date of Patent: *Nov. 10, 2026**

(54) ELECTRICAL CONNECTOR SYSTEM

(71) Applicant: TE Connectivity Solutions GmbH, Schaffhausen (CH)

(72) Inventors: Jared Evan Rossman, York Haven, PA (US); Brian Patrick Costello, Athens, GA (US)

(73) Assignee: TE CONNECTIVITY SOLUTIONS GmbH, Schaffhausen (CH)

(*) Notice: Subject to any disclaimer, the term of this patent is extended or adjusted under 35 U.S.C. 154(b) by 297 days.

This patent is subject to a terminal disclaimer.

(21) Appl. No.: 18/422,389

(22) Filed: Jan. 25, 2024

(65) Prior Publication Data

US 2025/0246833 A1 Jul. 31, 2025

(51) Int. Cl.

| | |
|---|---|
| ***H01R 12/75*** | (2011.01) |
| ***H01R 12/72*** | (2011.01) |
| ***H01R 13/629*** | (2006.01) |
| ***H01R 13/6581*** | (2011.01) |

(52) U.S. Cl.

CPC ........... *H01R 12/75* (2013.01); *H01R 12/722* (2013.01); *H01R 13/629* (2013.01); *H01R 13/6581* (2013.01)

(58) Field of Classification Search

CPC .... H01R 12/75; H01R 12/722; H01R 13/629; H01R 13/631; H01R 13/6581

USPC ............................................................ 439/78

See application file for complete search history.

(56) References Cited

U.S. PATENT DOCUMENTS

| | | | | |
|---|---|---|---|---|
| 5,205,741 | A * | 4/1993 | Steen | G01R 1/0425 439/70 |
| 5,383,787 | A * | 1/1995 | Switky | H10W 78/00 439/71 |
| 6,144,559 | A * | 11/2000 | Johnson | H05K 1/0246 361/825 |
| 6,347,946 | B1 * | 2/2002 | Trobough | H05K 1/147 439/70 |
| 7,198,493 | B2 * | 4/2007 | Chen | H01R 13/2442 439/66 |
| 7,220,135 | B1 * | 5/2007 | Brekosky | H01R 12/523 439/75 |
| 8,133,061 | B1 * | 3/2012 | Ayers, Sr. | H01R 12/714 439/66 |
| 9,076,698 | B2 * | 7/2015 | Tran | H10W 70/688 |
| 9,591,782 | B2 * | 3/2017 | Sasaki | H05K 7/1409 |

(Continued)

*Primary Examiner* — Harshad C Patel

(57) ABSTRACT

An electrical connector system includes a circuit card assembly having a host circuit board, an interposer, and a socket connector arranged in a circuit stack. The interposer includes interposer contacts on an interposer circuit board. The socket connector includes compressible socket contacts having mating ends with separable mating interfaces. The electrical connector system includes a pluggable module having a module circuit board held in a module body at the mating end configured to be loaded into the module mating zone in a module loading direction and mated with the socket contacts in a contact mating direction generally perpendicular to the module loading direction to compress the socket contacts between the module circuit board and the interposer contacts and create circuit paths between the module contacts and the interposer contacts through the socket contacts.

18 Claims, 13 Drawing Sheets

(56) References Cited

U.S. PATENT DOCUMENTS

| | | | | |
|---|---|---|---|---|
| 9,640,887 | B2 * | 5/2017 | Ganesan | H01R 12/62 |
| 10,148,024 | B2 * | 12/2018 | Ju | H01R 12/57 |
| 10,276,995 | B2 * | 4/2019 | Little | G02B 6/4284 |
| 10,535,935 | B2 * | 1/2020 | Ju | H01R 12/714 |
| 10,903,594 | B2 * | 1/2021 | Herring | H01R 13/6272 |
| 10,938,135 | B2 * | 3/2021 | Qiao | H01R 12/737 |
| 11,398,694 | B2 * | 7/2022 | Henry | H01R 13/627 |
| 11,404,811 | B2 * | 8/2022 | Do | H01R 12/7082 |
| 11,646,528 | B2 * | 5/2023 | Li | H01R 13/533<br>439/271 |
| 12,414,263 | B2 * | 9/2025 | Yang | H05K 7/20254 |
| 2014/0268577 | A1 * | 9/2014 | Swaminathan | H05K 1/11<br>174/251 |
| 2019/0288457 | A1 | 9/2019 | Champion et al. | |
| 2020/0295483 | A1 | 9/2020 | Costello et al. | |
| 2020/0301084 | A1 | 9/2020 | Champion et al. | |
| 2022/0354013 | A1 * | 11/2022 | Costello | H05K 7/1061 |
| 2025/0246832 | A1 * | 7/2025 | Rossman | H05K 9/0058 |

* cited by examiner

ELECTRICAL CONNECTOR SYSTEM

BACKGROUND OF THE INVENTION

The subject matter herein relates generally to electrical connector systems.

Some communication systems utilize communication connectors, such as card edge connectors to interconnect various components of the system for data communication. Some known communication systems use pluggable modules, such as I/O modules, that are electrically connected to the card edge connectors. The pluggable modules have module circuit boards having card edges that are mated with the card edge connectors during the mating operation. The module circuit boards are typically limited to two rows of contacts with a first row of the contacts on the upper surface of the module circuit board and with a second row of the contacts on the lower surface of the module circuit board. As such, the density of the communication system is limited by the mating interface defined by the card edge connector and the module circuit board. The card edge connectors are typically mounted to a circuit board and signal paths are routed through the circuit board to another electronic device, such as an integrated circuit. However, the systems are subject to signal degradation along the length of the traces between the card edge connectors and the integrated circuit, particularly at higher speeds.

A need remains for a high-speed communication system having high contact density.

BRIEF DESCRIPTION OF THE INVENTION

In one embodiment, an electrical connector system is provided and includes a circuit card assembly which includes a host circuit board, an interposer, and a socket connector arranged in a circuit stack. The interposer includes an interposer circuit board that has interposer contacts. The interposer contacts have mating ends and terminating ends opposite the mating ends. The socket connector includes socket contacts. The socket contacts are compressible. The socket contacts have first mating ends and second mating ends. The first mating ends have separable mating interfaces at a module mating zone. The second mating ends have separable mating interfaces. The second mating ends are connected to the mating ends of the corresponding interposer contacts. The electrical connector system includes a pluggable module that includes a module body having a top and a bottom. The pluggable module has a mating end. The pluggable module includes a module circuit board held by the module body at the mating end. The mating end configured to be loaded into the module mating zone in a module loading direction such that the module circuit board is aligned with the circuit stack. The module circuit board has module contacts mated with the corresponding first mating ends of the socket contacts in a contact mating direction generally perpendicular to the module loading direction to compress the socket contacts between the module circuit board and the interposer contacts and create circuit paths between the module contacts and the interposer contacts through the socket contacts.

In another embodiment, an electrical connector system is provided and includes a circuit card assembly which includes a host circuit board, a cage mounted to the host circuit board, a socket connector received in the cage, and an interposer received in the cage. The cage has shielding walls forming a module channel extending between a front and a rear of the cage. The interposer and the socket connector arranged in a circuit stack above the host circuit board at the rear of the cage. The interposer includes an interposer circuit board that has interposer contacts. The interposer contacts have mating ends and terminating ends opposite the mating ends. The socket connector includes socket contacts. The socket contacts are compressible. The socket contacts have first mating ends and second mating ends. The first mating ends have separable mating interfaces. The second mating ends have separable mating interfaces. The second mating ends are connected to the mating ends of the corresponding interposer contacts. The electrical connector system includes a pluggable module that includes a module body having a top and a bottom. The pluggable module has a mating end. The mating end of the pluggable module is loaded into the module channel in a module loading direction to the module mating zone to align the mating end with the circuit stack. The pluggable module includes a module circuit board held by the module body at the mating end. The module circuit board has module contacts. The pluggable module is movable relative to the cage in a contact mating direction generally perpendicular to the module loading direction to mate the module contacts with the corresponding first mating ends of the socket contacts in the contact mating direction to compress the socket contacts between the module circuit board and the interposer contacts and create circuit paths between the module contacts and the interposer contacts through the socket contacts.

In a further embodiment, an electrical connector system is provided and includes a circuit card assembly which includes a host circuit board, a cage mounted to the host circuit board, a socket connector received in the cage, and an interposer received in the cage. The cage has shielding walls forming a module channel extending between a front and a rear of the cage. The cage has a module port at the front open to the module channel. The interposer and the socket connector arranged in a circuit stack above the host circuit board at the rear of the cage. The interposer includes an interposer circuit board that has interposer contacts. The interposer contacts have mating ends and terminating ends opposite the mating ends. The socket connector includes socket contacts. The socket contacts are compressible. The socket contacts have first mating ends and second mating ends. The first mating ends have separable mating interfaces. The second mating ends have separable mating interfaces. The second mating ends are connected to the mating ends of the corresponding interposer contacts. The electrical connector system includes a pluggable module that includes a module body having a top, a bottom, a first side, and a second side forming a module cavity. The pluggable module has a mating end and a cable end opposite the mating end. The pluggable module includes at least one communication cable extending from the cable end. The mating end of the pluggable module is loaded into the module channel in a module loading direction to the module mating zone to align the mating end with the circuit stack. The pluggable module includes a module circuit board held by the module body at the mating end. The module circuit board has module contacts communicatively coupled to the at least one communication cable. The pluggable module is movable relative to the cage in a contact mating direction generally perpendicular to the module loading direction to mate the module contacts with the corresponding first mating ends of the socket contacts in the contact mating direction to compress the socket contacts between the module circuit board and the interposer contacts and create circuit paths between the module contacts and the interposer contacts through the socket contacts.

DETAILED DESCRIPTION OF THE INVENTION

Figure 1:
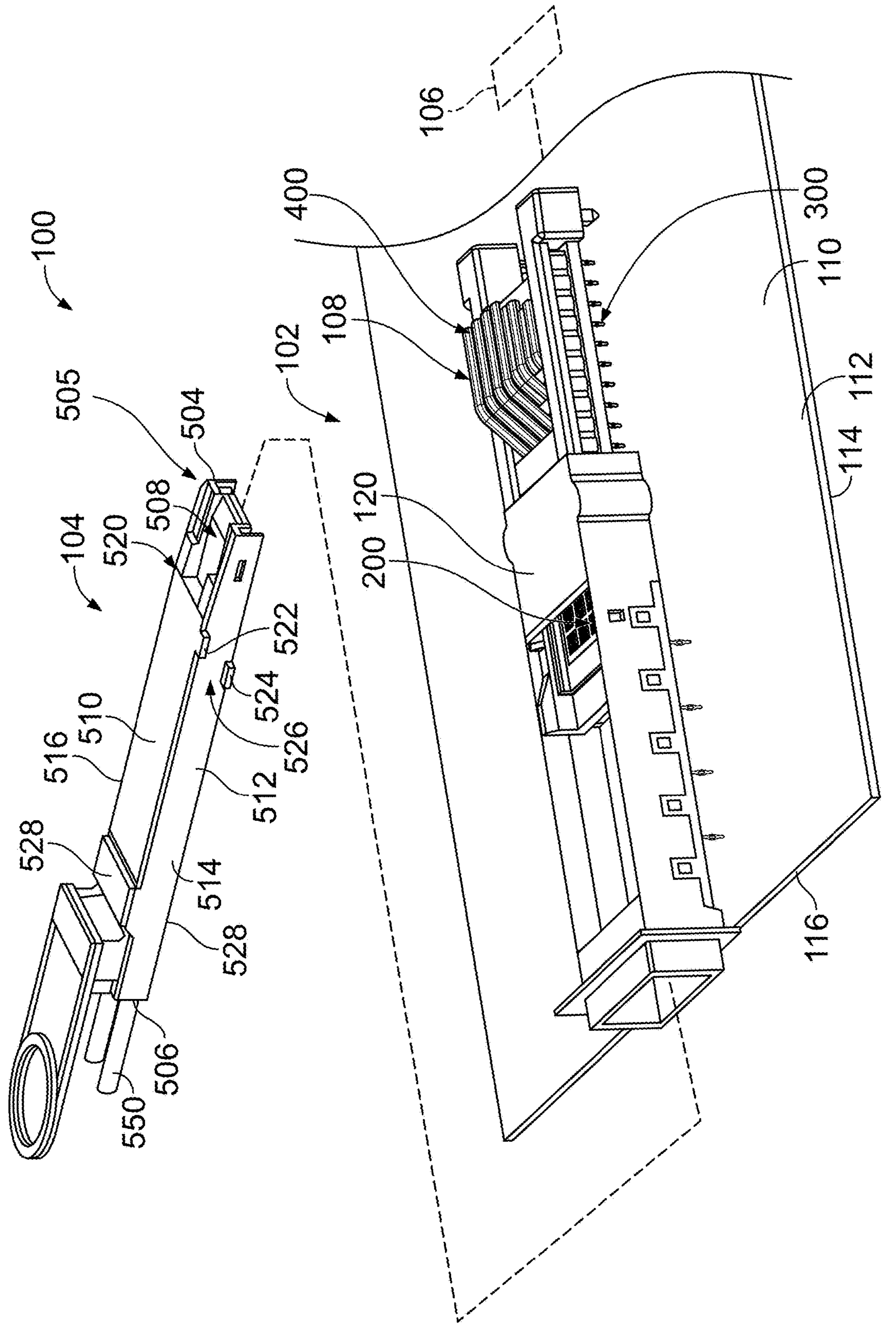
FIG. 1 is a front perspective view of an electrical connector system formed in accordance with an exemplary embodiment.

FIG. 1 is a front perspective view of an electrical connector system 100 formed in accordance with an exemplary embodiment. The electrical connector system 100 includes a circuit card assembly 102 and a pluggable module 104 configured to be mated with the circuit card assembly 102. Multiple circuit card assemblies 102 may be provided within the electrical connector system 100. In various embodiments, multiple pluggable modules 104 may be mated with the circuit card assembly 102. The pluggable modules 104 are removably coupled to the circuit card assembly 102. The pluggable modules 104 may be I/O modules forming part of a communication system. The circuit card assembly 102 of the communication system may be part of an end point device, a server or network switch, or another type of communication system.

In an exemplary embodiment, the circuit card assembly 102 includes a host circuit board 110, a cage 120, and a connector assembly 108 received in the cage 120 and configured to be electrically connected to the pluggable module 104. The connector assembly 108 may be mounted to the host circuit board 110. The connector assembly 108 may be electrically connected to the host circuit board 110. The connector assembly 108 of the circuit card assembly 102 includes a socket connector 200 and an interposer 300. The connector assembly 108 of the circuit card assembly 102 may include a cable assembly 400 electrically connected to the interposer 300. The cable assembly 400 is electrically connected to the pluggable module 104 through the interposer 300 and the socket connector 200. The interposer 300 may be electrically connected to the host circuit board 110. For example, one or more power and/or ground circuits may be connected to the host circuit board 110. In various embodiments, low speed and/or high-speed signal lines may be electrically connected to the host circuit board 110 to connect the pluggable module 104 to the host circuit board 110 through the interposer 300 and the socket connector 200. In other various embodiments, the circuit card assembly 102 may be provided without the cable assembly 400. Rather, all of the signal lines are connected from the interposer 300 to the host circuit board 110 rather than some or all of the signal lines being connected to the cable assembly 400.

Optionally, the circuit card assembly 102 includes multiple connector assemblies 108 (for example, multiple socket connectors 200/interposers 300/cable assemblies 400) for interfacing with the corresponding pluggable modules 104. Optionally, the circuit card assembly 102 may include multiple cages 120 to accommodate the corresponding socket connectors 200 and interposers 300. The cage 120 is mounted to the host circuit board 110. The cage 120 provides shielding for the circuits (for example, the pluggable module 104 and/or the socket connector 200 and/or the interposer 300 and/or the cable assembly 400. In alternative embodiments, the circuit card assembly 102 may be used without the cage 120. In other alternative embodiments, the circuit card assembly 102 may be used without the cable assembly 400. For example, the interposer 300 may be directly electrically connected to the host circuit board 110 instead of routing the signals through the cable assembly 400.

The circuit card assembly 102 may be loaded into a rack or cabinet of a communication system, such as a rack or cabinet of a server or network switch. For example, the host circuit board 110 may be provided on a rack or tray at a bottom of the circuit card assembly 102. The host circuit board 110 includes an upper surface 112 and a lower surface 114. The host circuit board 110 includes a front edge 116. The cage 120 is coupled to the host circuit board 110 at the front edge 116. Optionally, multiple host circuit boards 110 may be arranged in the communication system. The circuit card assembly 102 may be coupled to a panel at a front of the circuit card assembly 102. In an exemplary embodiment, the system includes one or more electrical devices 106 on the host circuit board 110. For example, the electrical device 106 may be an integrated circuit, such as an IC chip mounted to the host circuit board 110. Other types of electrical devices may be mounted to the host circuit board 110, such as a processor, a memory module, or other type of electrical device. The electrical device 106 may be located proximate to a rear edge of the host circuit board 110 in various embodiments. Alternately, the electrical device 106 may be located on another host circuit board.

In an exemplary embodiment, the pluggable modules 104 are electrically connected to the electrical device 106. For example, the pluggable modules 104 may be connected to the electrical device 106 through circuit traces on the host circuit board 110. In an exemplary embodiment, the pluggable modules 104 are connected to the electrical device 106 through the cable assemblies 400, such as through high-speed cables, for improved signal performance (for example, reduced loss and/or cross talk). The cables of the cable assembly 400 are configured to be routed over the board to another component, such as an electrical connector, for connection to the electrical device 106.

Figure 2:
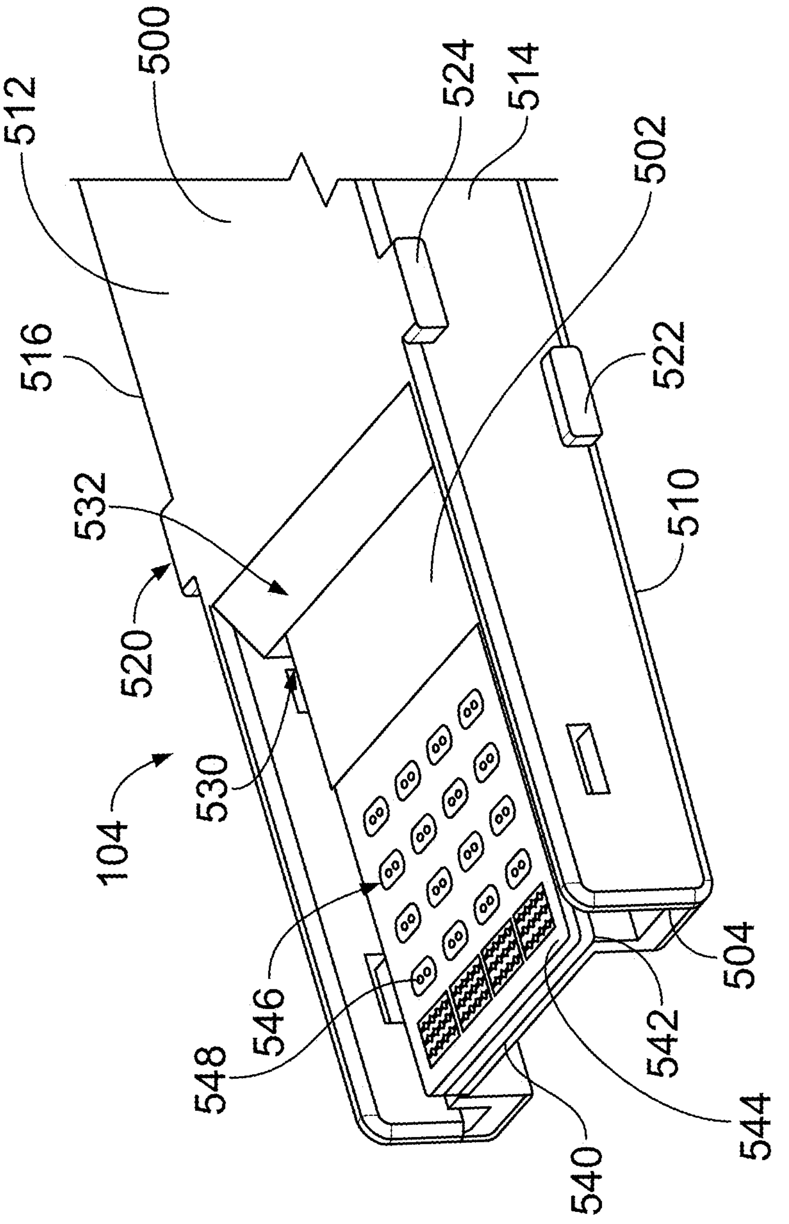
FIG. 2 is a bottom perspective view of the pluggable module in accordance with an exemplary embodiment.

With additional reference to FIG. 2, which is a bottom perspective view of the pluggable module 104, the pluggable module 104 is a cable connector. For example, the pluggable module 104 may be an input/output (I/O) connector, such as a transceiver module. In various embodiments, the pluggable module 104 may be similar to a SFP, QSFP, OSFP or other I/O form factor.

The pluggable module 104 includes a module body 500 holding a module circuit board 502 (FIG. 2). The module body 500 extends between a front 504 and a rear 506. In an exemplary embodiment, the pluggable module 104 includes an actuation feature 508 at or near the front 504. The front 504 of the pluggable module 104 defines a mating end configured to be loaded into the cage 120 for mating with the connector assembly 108. The actuation feature 508 is used to position the pluggable module 104 for mating with the socket connector 200. The module body 500 includes a top 510 and a bottom 512. The module body 500 includes a first side 514 and a second side 516. In the illustrated embodiment, the actuation feature 508 is a ramp at the top 510. The actuation feature 508 may be a cam surface. Other types of actuation features 508 may be used in alternative embodiments, such as a biasing element. The actuation features 508 may be located at other locations in alternative embodiments.

In an exemplary embodiment, the module body 500 includes guide features 520 configured to guide mating of the module body 500 with the circuit card assembly 102. Optionally, the guide features 520 extend longitudinally along the sides 514, 516 between the front 504 and the rear 506. In the illustrated embodiment, the guide features 520 include guide lugs, such as upper guide lugs 522 and lower guide lugs 524. The guide lugs 522, 524 extend outward from the sides 514, 516. The upper guide lugs 522 may be provided at or near the top 510. The lower guide lugs 545 may be provided at or near the bottom 512. The guide lugs 522, 524 may be rectangular shaped. However, the guide lugs 522, 524 may have other shapes in alternative embodiments. The guide lugs 522, 524 are separated by a gap 526, which is configured to receive a guide feature of the cage 120, such as a guide rail. In various embodiments, the guide lugs 522, 524 are offset from each other. For example, the upper guide lugs 522 may be located closer to the front 504 compared to the lower guide lugs 524. Other types of guide features may be provided in alternative embodiments, such as rails, ribs, pins, shoulders, grooves, channels, and the like.

In an exemplary embodiment, the module body 500 includes embossments 528 proximate to the rear 506. The embossments 528 are used to locate the pluggable module 104 in the cage 120. For example, the embossments 528 are configured to engage the cage 120 to vertically position the rear end of the pluggable module 104 in the cage 120. In the illustrated embodiment, the module body 500 includes an embossment 528 at the top 504 that is used to hold the top 510 of the module body 500 spaced apart from the top of the cage 120. In the illustrated embodiment, the module body 500 includes an embossment 528 at the bottom 506 that is used to hold the bottom 512 of the module body 500 spaced apart from the bottom of the cage 120. The embossments 528 may have similar heights to center the module body 500 in the module channel of the cage 120. Other types of locating features may be provided in alternative embodiments to position the module body 500 relative to the cage 120. The embossments 528 may be used to engage with EMI springs on the inside of the cage (not shown) to seal the front of the cage when a module is inserted.

In an exemplary embodiment, the module body 500 includes a cavity 530 that receives the module circuit board 502. The module body 500 includes a window 532 open at the bottom 512 to expose the module circuit board 502 in the cavity 530. Optionally, the window 532 may be located proximate to the rear 506.

The module circuit board 502 includes a leading edge 540 (FIG. 2) extending between an upper surface 542 and a lower surface 544. The lower surface 544 is exposed in the window 532 at the bottom 512 of the module body 500. The module circuit board 502 includes a module contact array 546 of module contacts 548 at the lower surface 544 proximate to the leading edge 540. In an exemplary embodiment, the module contacts 548 are defined by circuits of the module circuit board 502, such as pads, traces, vias, and the like. In alternative embodiments, the module contacts 548 may be spring beam contacts having deflectable spring beams defining a compressible mating interface. The module contacts 548 are arranged in a plurality of rows and a plurality of columns. In an exemplary embodiment, the module contacts 548 are arranged in greater than three rows and arranged in greater than three columns. In various embodiments, the module contacts 548 are arranged in signal pairs surrounded by a ground plane. In other various embodiments, the module contacts may include signal pads and ground pads arranged in an array, such as a 12×12 array. The module contacts 548 may include high-speed signal contacts and/or low speed signal contacts and/or ground contacts and/or power contacts. The module contacts 548 may be arranged in greater or fewer rows and in greater or fewer columns. Having a large number of rows and/or columns provides a dense mating interface for the pluggable module 104 having many high-speed signal lines through the pluggable module 104.

In an exemplary embodiment, the pluggable module 104 includes one or more cables 550. The cable 550 may be a fiber optic cable optically connected to the module circuit board 502. In alternative embodiments, the cables 550 may be copper cables having electrical conductors configured to be directly terminated to the module circuit board 502. For example, the cables 550 may be high-speed differential pair cables.

Figure 3:
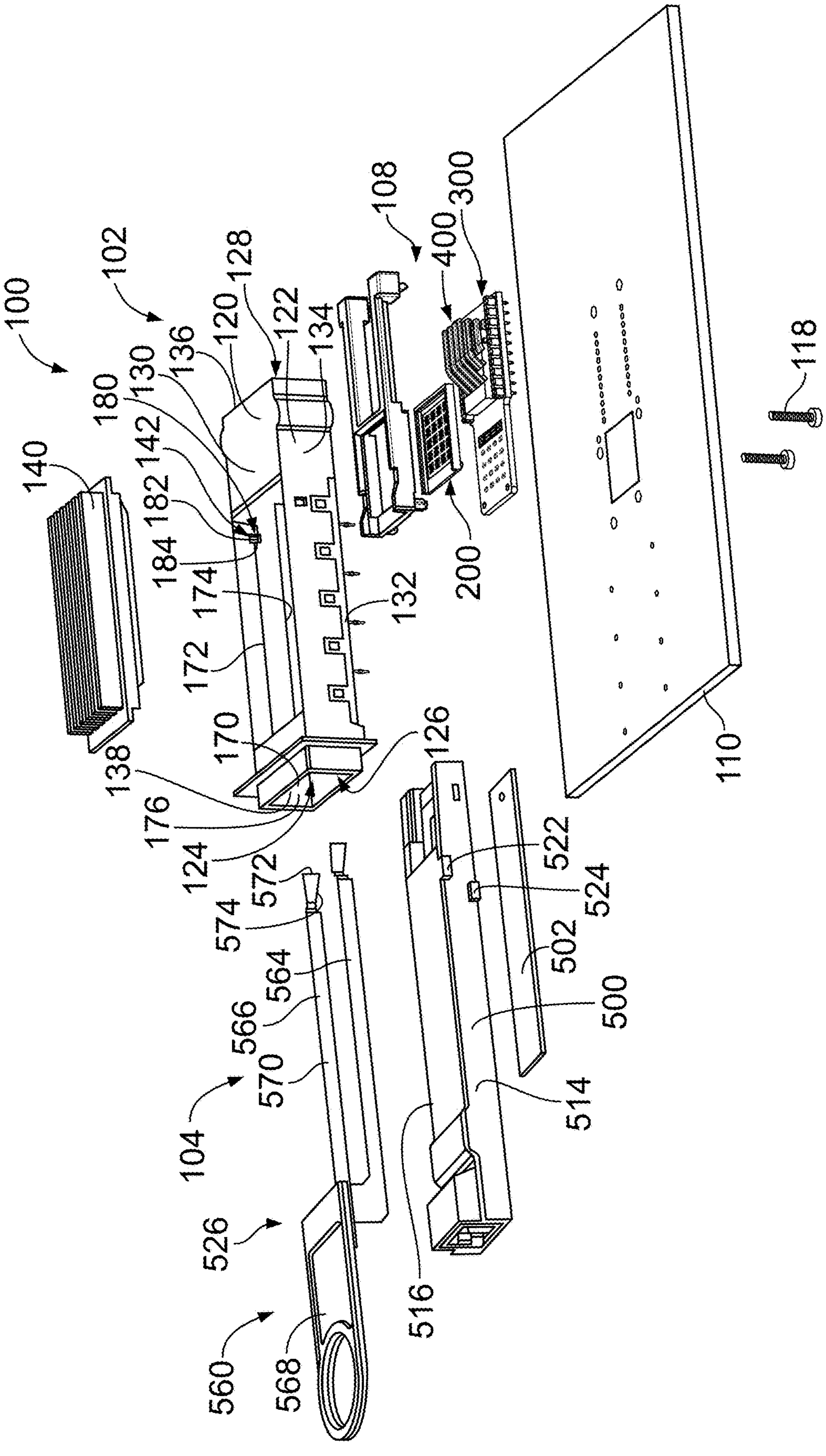
FIG. 3 is an exploded view of the electrical connector system in accordance with an exemplary embodiment.

FIG. 3 is an exploded view of the electrical connector system 100 in accordance with an exemplary embodiment. FIG. 3 illustrates the circuit card assembly 102 and the pluggable module 104 in accordance with an exemplary embodiment. FIG. 3 illustrates the host circuit board 110, the cage 120, and the connector assembly 108 including the socket connector 200, the interposer 300, and the cable assembly 400 of the circuit card assembly 102. FIG. 3 illustrates the module body 500 and the module circuit board 502 of the pluggable module 104. FIG. 3 also illustrates a latching device 560 for latchably coupling the pluggable module 104 to the circuit card assembly 102, such as to the cage 120.

In an exemplary embodiment, the latching device 560 of the pluggable module 104 includes a first latch 564 along the first side 514 and a second latch 566 along the second side 516. The latches 564, 566 may be positioned within the interior cavity of the module body 500. A release tab 568 is operably coupled to the first and second latches 564, 566 to release the first and second latches 564, 566 to allow removal of the pluggable module 104 from the cage 120. For example, the release tab 568 may be a pull tab configured to be pulled rearward to release the latches 524, 526. In an exemplary embodiment, each of the latches 564, 566 includes a latch arm 570 and a latching finger 572 at the distal end of the latch arm 570. The latching finger 572 is configured to be latchably coupled to the circuit card assembly 102, such as to the cage 120. Optionally, the latching finger 572 includes a ramp element 574. The ramp element 574 may interface with a release ramp of the circuit card assembly 102 to release the latching fingers 572 when the release tab 568 is actuated.

The cage 120 is configured to be mounted to the host circuit board 110, such as using fasteners 118. In an exemplary embodiment, the cage 120 is enclosed and provides electrical shielding for the components. The cage 120 includes a plurality of shielding walls 122 that define one or more module channels 124 for receipt of corresponding pluggable module(s) 104. The shielding walls 122 may be walls defined by solid sheets, perforated walls to allow airflow therethrough, walls with cutouts, such as for a heatsink or heat spreader to pass therethrough, or walls defined by rails or beams with relatively large openings. In an exemplary embodiment, the cage 120 is a shielding, stamped and formed metallic cage member. In other embodiments, the cage 120 may be open between frame members, such as rails or beams, to guide mating of the pluggable module 104 with the socket connector 200.

In the illustrated embodiment, the cage 120 is a single port cage configured to receive a single pluggable module 104 in a single module channel 124. However, in alternative embodiments, the cage 120 may include multiple ports to receive multiple pluggable modules, such as being a stacked cage member having upper and lower module channels or having side-by-side module channels 124. The module channels may be arranged in a single column, however, the cage 120 may include multiple columns of ganged module channels in alternative embodiments (for example, 2×2, 3×2, 4×2, 4×3, etc.). The cage 120 includes a front port 126 providing access to the module channel 124. The pluggable module 104 is plugged into the module channel 124 through the port 126. The cage 120 may include a rear port 128 providing access to the module channel 124. The interposer 300 is plugged into the module channel 124 through the rear port 128.

In an exemplary embodiment, the shielding walls 122 of the cage 120 include a top wall 130, a bottom wall 132, and side walls 134 extending between the top wall 130 and the bottom wall 132. The bottom wall 132 may rest on the host circuit board 110. However, in alternative embodiments, the cage 120 may be provided without the bottom wall 132. Optionally, the shielding walls 122 of the cage 120 may include a rear wall 136 at the rear of the cage 120 and a front wall 138 at the front of the cage 120. The port 126 is provided in the front wall 138. The rear port 128 is provided in the rear wall 136. The shielding walls 122 define a cavity, which forms the module channel(s) 124. The cavity is defined by the top wall 130, the bottom wall 132, the side walls 134, the rear wall 136 and the front wall 138. Other shielding walls 122 may separate or divide the cavity into various module channels 124. For example, the shielding walls 122 may include a channel separator between upper and lower module channels 124. The shielding walls 122 may include divider walls, parallel to the side walls 134, extending between the top wall 130 and the bottom wall 132 to separate adjacent module channels 124 from each other.

In an exemplary embodiment, the cage 120 may include one or more gaskets at the front wall 138 for providing electrical shielding for the module channel 124. For example, the gaskets may be configured to electrically connect with the pluggable module 104 received in the module channel 124. The gaskets may be configured to electrically connect to a panel or bezel. In an exemplary embodiment, the cage 120 may include one or more gaskets at the rear wall 136 for providing electrical shielding for the module channel 124. For example, the gaskets may be configured to electrically connect with the interposer 300 received in the module channel 124.

In an exemplary embodiment, the cage 120 may include one or more heat sinks 140 for dissipating heat from the pluggable module 104. For example, the heat sink 140 may be coupled to the top wall 130 and extend through an opening 142 in the top wall 130 to engage the pluggable module 104 and dissipate heat from the pluggable module 104.

In an exemplary embodiment, the cage 120 includes guide rails 170 along the shielding walls 122. For example, the guide rails 170 may extend along the side walls 134. The pluggable module 104 is configured to engage the guide rails 170 to guide loading of the pluggable module 104 into the module channel 124. For example, the guide lugs 522, 524 may engage the guide rails 170 (also shown in FIG. 12, for example) to guide loading of the pluggable module 104 into the module channel 124. The guide rails 170 extend between the front and the rear of the cage 120. Optionally, the guide rail 170 may be located at the front.

In an exemplary embodiment, the guide rails 170 extend inward from the side walls 134 into the module channel 124. However, in alternative embodiments, the guide rails 170 may form channels or slots that extend into the side walls 134 rather than protruding from the side walls 134. Each guide rail 170 includes an upper ledge 172 and a lower ledge 174. The ledges 172, 174 may be parallel to each other, such as being parallel to the top wall 130 and/or the bottom wall 132. The upper guide lug 522 is configured to slide along the upper ledge 172 and/or the lower guide lug 524 is configured to slide along the lower ledge 174 to vertically position the pluggable module 104 relative to the cage 120 within the module channel 124. In an exemplary embodiment, the guide rails 170 include lead-in surfaces 176 at the front end to guide the guide lugs 522, 524 onto the guide rails 170. In an exemplary embodiment, the guide rail 170 is configured to hold the pluggable module 104 at an elevated position elevated from the bottom wall 132 during loading. The guide rail 170 guides the mating end of the pluggable module 104 to a position for mating with the socket connector 200, such as a position located vertically above the socket connector 200 for mating to the socket connector 200 in a generally vertical mating direction.

Figure 12:
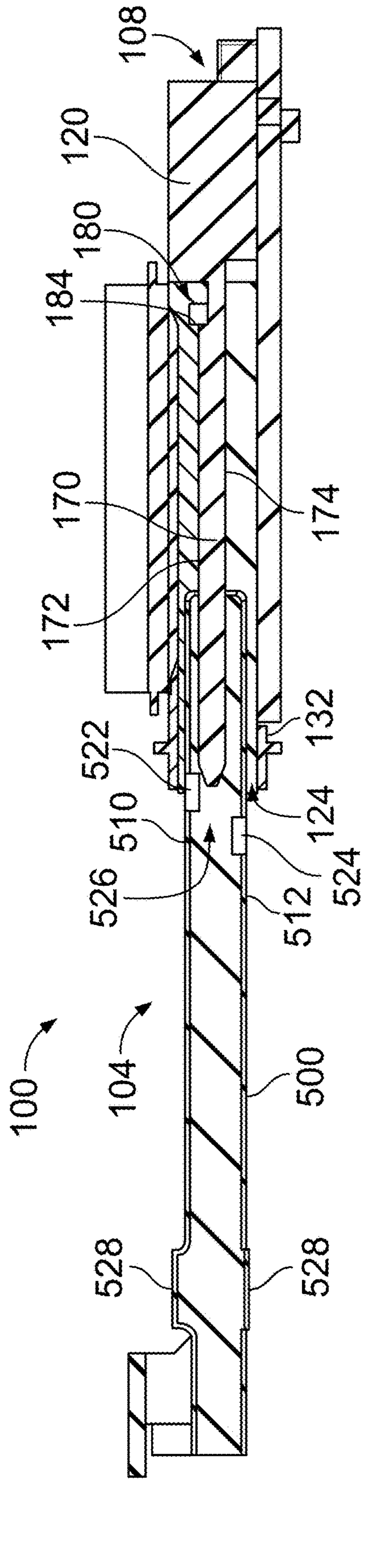
FIG. 12 is a side view of the electrical connector system showing the pluggable module initially loaded into the cage in accordance with an exemplary embodiment.

In an exemplary embodiment, each guide rail 170 includes a drop pocket 180 at a position remote from the front of the cage 120 (also shown in FIG. 12). The drop pocket 180 may be located proximate to the socket connector 200. The drop pocket 180 forms a recess configured to receive the upper guide lug 522. The upper guide lug 522 is configured to drop into the drop pocket 180 to allow the mating end of the pluggable module 104 to move in vertically downward mating direction for mating with the socket connector 200. The pluggable module 104 is loaded in the horizontal loading direction until the upper guide lug 522 is aligned with the drop pocket 180 and drops into the drop pocket 180 for mating with the socket connector 200. The drop pocket 180 has a drop pocket ledge 182 in the drop pocket 180. The drop pocket ledge 182 is lower than the upper ledge 172, such as being located closer to the bottom wall 132 of the cage 120. The upper guide lug 522 drops downward in the drop pocket 180 toward the drop pocket ledge 182. The pluggable module 104 may be suspended in the drop pocket 180 (for example, floating) and supported by the socket connector 200, which may be controlled by the compression of the socket contacts being mated to the pluggable module 104. The drop pocket 180 has a predetermined depth to control an amount of downward movement of the pluggable module 104 in the mating direction.

In an exemplary embodiment, the guide rail 170 includes a stop shoulder 184 between the drop pocket ledge 182 and the upper ledge 172. The upper guide lug 522 may be seated against the stop shoulder 184 to locate the pluggable module 104 within the module channel 124. For example, the stop shoulder 184 may define a datum surface for locating the pluggable module 104. The pluggable module 104 may be pressed rearward to press the upper guide lug 522 against the stop shoulder 184 to position the pluggable module 104 within the module channel 124, such as to align the module circuit board 502 with the socket connector 200 to mate the module contacts with the socket contacts.

In an exemplary embodiment, the socket connector 200 is received in the cage 120, such as proximate to the rear wall 136. The socket connector 200 is located between the side walls 134. The interposer 300 is received in the cage 120, such as proximate to the rear wall 136. The interposer 300 is located between the side walls 134. In an exemplary embodiment, an interposer frame 330 holds the interposer 300 and/or the socket connector 200 to position the interposer 300 and the socket connector 200 relative to each other and/or relative to the cage 120 and/or relative to the host circuit board 110. The interposer 300 is configured to be positioned between the socket connector 200 and the host circuit board 110. Optionally, a portion of the interposer 300 may be located exterior of the cage 120, such as behind the rear wall 136. For example, the cable assembly 400 may be located exterior of the cage 120. The pluggable module 104 may be received in the cage 120 between the socket connector 200 and the top wall 130.

In an exemplary embodiment, the pluggable module 104 is loaded through the front wall 138 in a module loading direction (for example, horizontally) to mate with the socket connector 200 and the interposer 300 is loaded through the rear wall 136 to mate with the socket connector 200. For example, the socket connector 200 is located at or near the rear wall 136. The pluggable module 104 is plugged into the cavity through the front port 126 at the front wall 138. The interposer 300 may be plugged into the cavity through the rear port 128 to interface with the socket connector 200. Alternatively, the interposer 300 and socket connector 200 may be pre-assembled to the host circuit board and the receptacle cage 120 may be mounted over the connector 108. The contacts of the components may form a contact stack. For example, the module contacts 548 of the pluggable module 104, the socket contacts of the socket connector 200, the interposer contacts of the interposer 300, and/or the board contacts of the host circuit board 110 may be arranged in a stacked configuration. The shielding walls 122 of the cage 120 provide electrical shielding around the pluggable module 104, the socket connector 200 and the interposer 300, such as around the mating interfaces.

Figure 4:
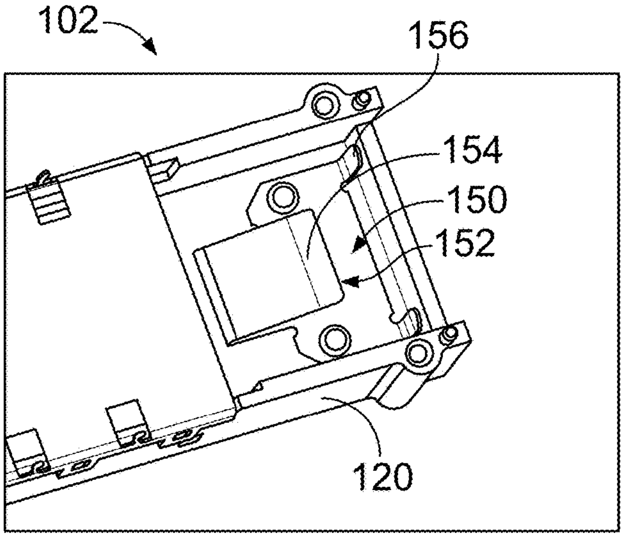
FIG. 4 is a bottom perspective view of a portion of the circuit card assembly showing the bottom of the cage in accordance with an exemplary embodiment.

FIG. 4 is a bottom perspective view of a portion of the circuit card assembly 102 showing the bottom of the cage 120. In an exemplary embodiment, the circuit card assembly 102 includes a loading mechanism 150 for electrically connecting pluggable module 104 with the socket connector 200 and/or the interposer 300. For example, the loading mechanism 150 is configured to press contacts of the components together to create a reliable electrical connection. The loading mechanism 150 may directly engage the pluggable module 104 to press the pluggable module 104 into mating engagement with the socket connector 200. The pressing force may be used to compress contacts, such as socket contacts of the socket connector 200, between the pluggable module 104 and the interposer 300.

In an exemplary embodiment, the loading mechanism 150 includes a load spring 152 configured to engage the pluggable module 104. In an exemplary embodiment, the load spring 152 includes a first spring arm 154 configured to engage the pluggable module 104 and press the pluggable module 104 in a first direction and a second spring arm 156 configured to engage the pluggable module 104 and press the pluggable module 104 in a second direction transverse to the first direction. For example, the first spring arm 154 may press the pluggable module 104 in a downward direction toward the socket connector 200 to vertically locate the pluggable module 104. The second spring arm 156 may press the pluggable module 104 in a rearward direction toward the stop shoulder 184 to horizontally locate the pluggable module 104.

Figure 5:
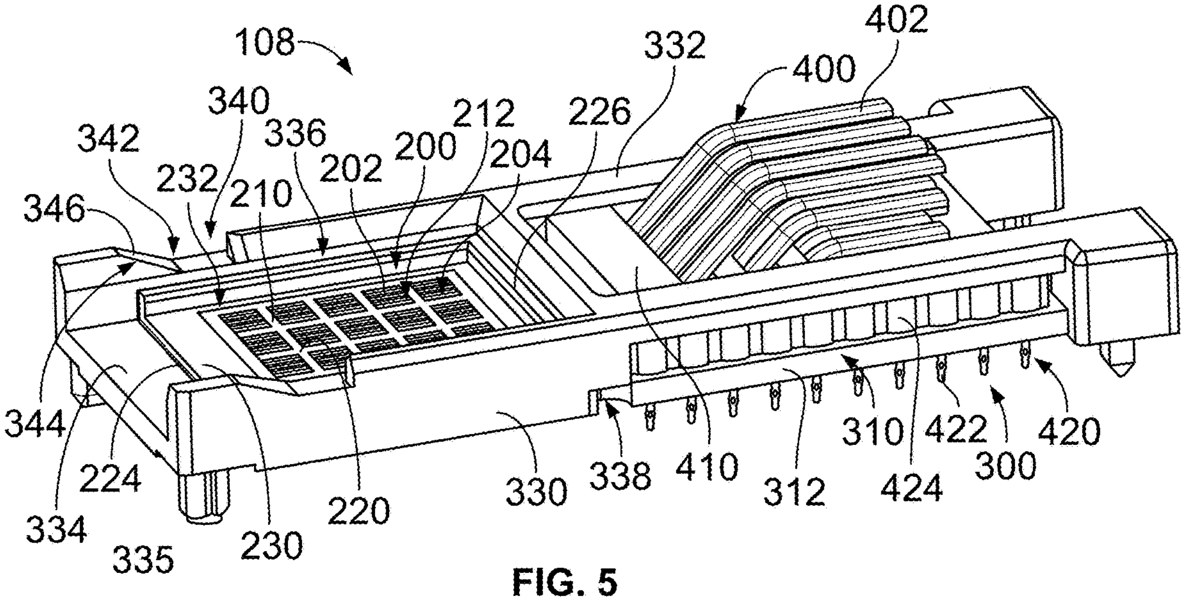
FIG. 5 is a perspective view of the connector assembly in accordance with an exemplary embodiment showing the socket connector and interposer connected together and held by the interposer frame.
Figure 6:
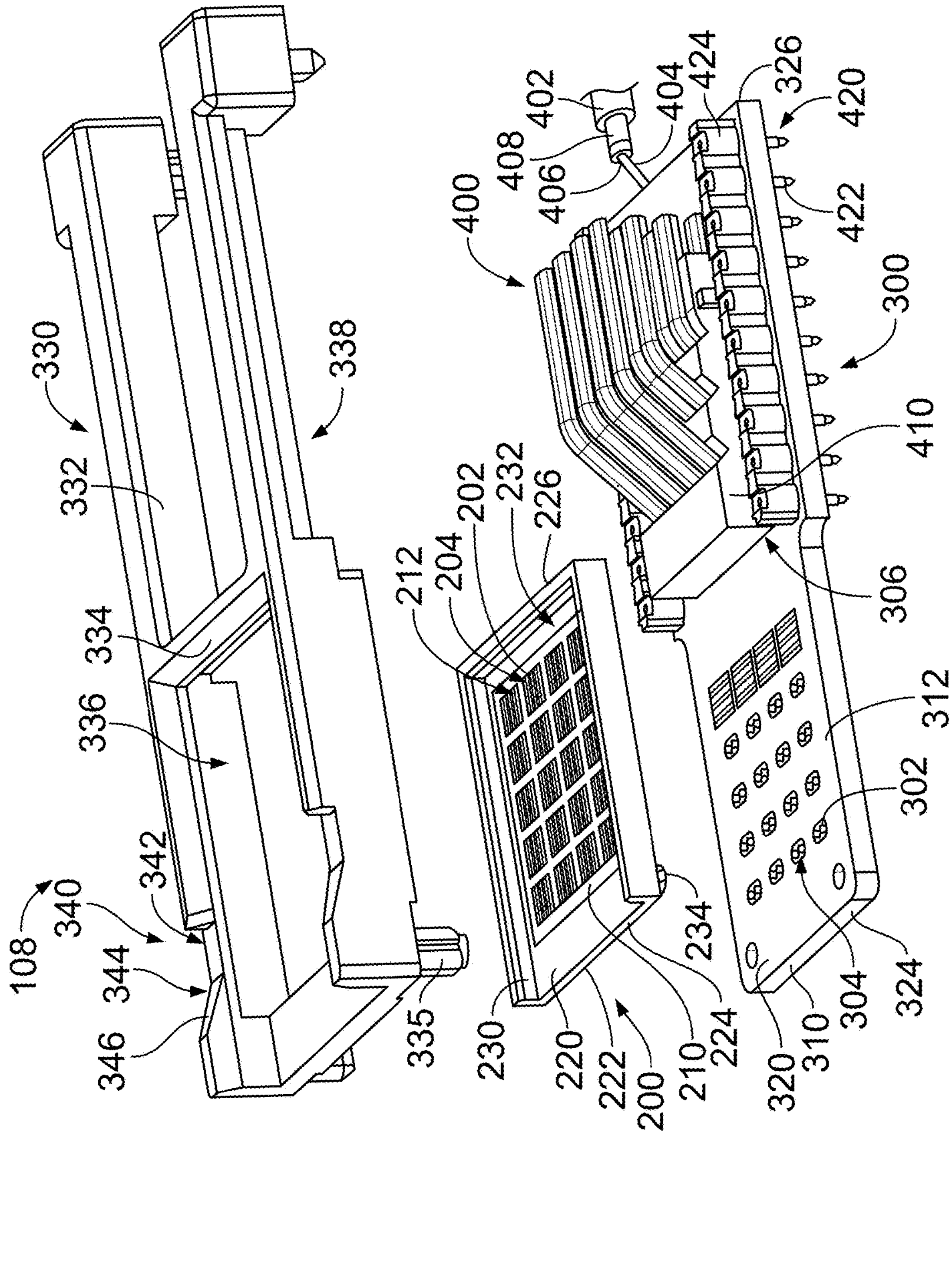
FIG. 6 is an exploded view of the connector assembly in accordance with an exemplary embodiment.
Figure 7:
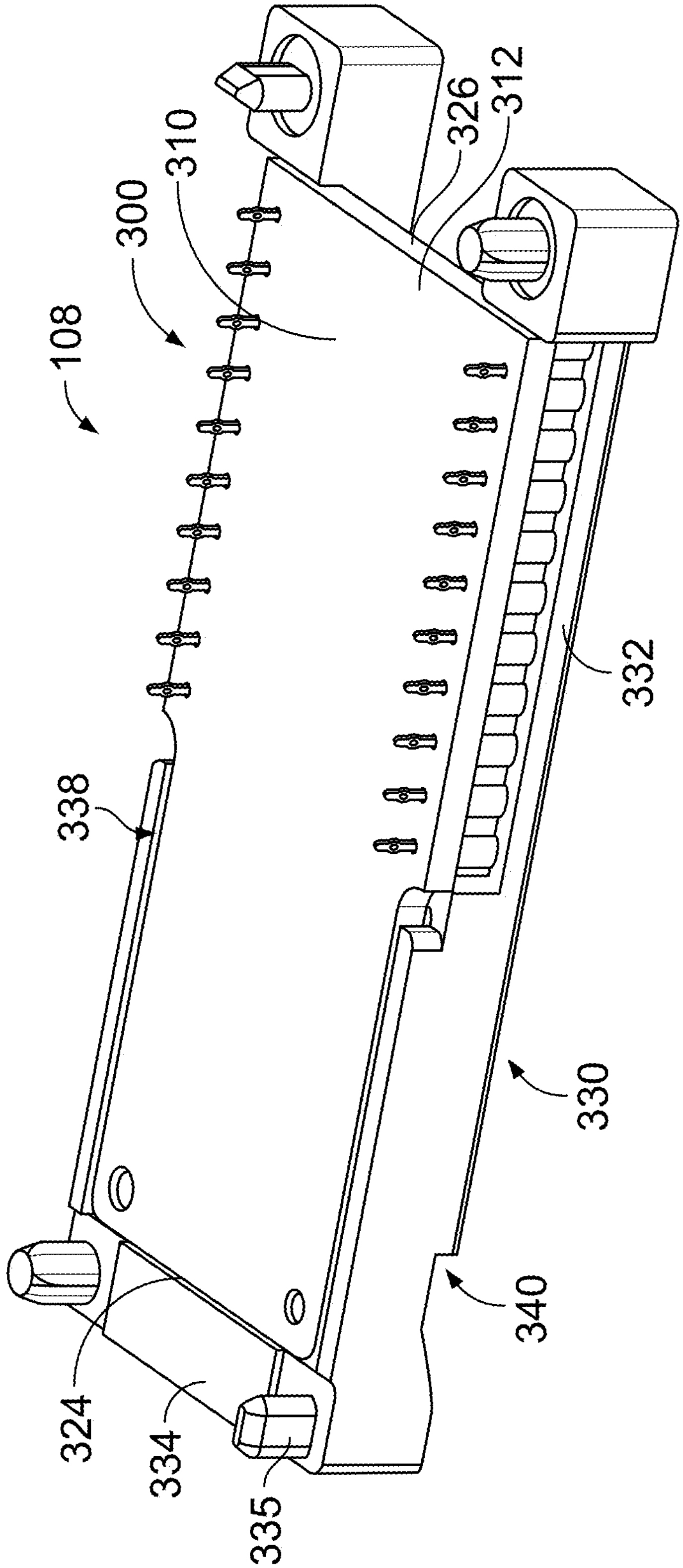
FIG. 7 is a bottom perspective view of the connector assembly in accordance with an exemplary embodiment showing the socket connector and interposer connected together and held by the interposer frame.

FIG. 5 is a perspective view of the connector assembly 108 in accordance with an exemplary embodiment showing the socket connector 200 and interposer 300 connected together and held by the interposer frame 330. FIG. 6 is an exploded view of the connector assembly 108 in accordance with an exemplary embodiment. FIG. 7 is a bottom perspective view of the connector assembly 108 in accordance with an exemplary embodiment showing the socket connector 200 and interposer 300 connected together and held by the interposer frame 330.

The socket connector 200 includes socket contacts 202 arranged in an array. The socket connector 200 includes a socket substrate 210 holding the socket contacts 202. In an exemplary embodiment, the socket contacts 202 are arranged in an upper contact array at an upper surface 220 of the socket substrate 210 and a lower contact array at a lower surface 222 of the socket substrate 210. The socket contacts 202 include mating ends 204 at the upper surface 220 and the lower surface 222. The socket contacts 202 extend between the first or upper mating ends and the second or lower mating ends.

The socket substrate 210 extends between a front 224 of the socket connector 200 and a rear 226 of the socket connector 200. In an exemplary embodiment, the socket substrate 210 is a molded part. The socket substrate 210 may be planar, such as being a plate. In an exemplary embodiment, the socket substrate 210 includes contact channels 212 that hold the socket contacts 202. The socket contacts 202 may be stitched or loaded into the contact channels 212. In other various embodiments, the socket substrate 210 may be molded around the socket contacts 202, such as being an overmolded part. In other various embodiments, the socket substrate 210 is a circuit board having circuits, such as pads, traces, vias and the like, forming the socket contacts 202. For example, the socket substrate 210 may include plated vias extending between contact pads on the upper surface 220 and the lower surface 222.

In an exemplary embodiment, the socket contacts 202 are stamped and formed contacts having spring beams forming upper contacts at the top of the socket connector 200 and spring beams forming lower contacts at the bottom of the socket connector 200. The socket contacts 202 are compressible, such as at the upper contacts and/or the lower contacts. In an exemplary embodiment, the socket contacts 202 include separable mating interfaces at the upper mating ends and/or the lower mating ends. In an exemplary embodiment, the socket contacts 202 are configured to mate with the pluggable module 104 at the upper mating ends and are configured to mate with the interposer 300 at the lower mating ends. The spring contacts are deflectable when mated with the pluggable module 104 or the interposer 300. For example, the pluggable module 104 may be coupled to the socket connector 200 from above to compress the spring contacts causing the mating interfaces to be spring biased against the pluggable module 104 or the interposer 300. In an exemplary embodiment, the upper mating interfaces are co-planer for mating with the pluggable module 104 from above and the lower mating interfaces are co-planar for mating with the interposer 300. The socket contacts 202 form a land grid array at the upper surface 220 and a land grid array at the lower surface 222. In other various embodiments, the socket contacts 202 may include solder balls forming a ball grid array at the upper surface 220 or the lower surface 222. For example, the socket contacts 202 may be soldered to the interposer contacts. In other various embodiments, the socket contacts 202 may be conductive polymer columns. In alternative embodiments, the connector assembly 108 may be provided without the interposer 300. For example, the socket connector 200 may be directly coupled to the host circuit board 110. For example, the lower mating interfaces of the socket contacts 202 may be connected to board contacts of the host circuit board 110, either at a separable mating interface or using a soldered connection, such as a ball grid array or land grid array.

In an exemplary embodiment, the socket connector 200 includes a socket frame 230 holding the socket substrate 210. In the illustrated embodiment, the socket frame 230 is coupled to edges of the socket substrate 210. In other various embodiments, the socket frame 230 may enclose the socket substrate 210, such as along the sides and/or the ends of the socket substrate 210. In various embodiments, the socket frame 230 may be integral with the socket substrate 210, such as being co-molded with the socket substrate 210. The socket frame 230 may be coupled to another component, such as the interposer frame 330 or the cage 120 to position the socket substrate 210 from mating with the pluggable module 104 and the interposer 300. The socket frame 230 may limit compression of the upper contacts and/or the lower contacts. In an exemplary embodiment, the socket frame 230 is a plastic frame extending along both sides and both ends of the socket substrate 210 to form a rectangular socket cavity 232. The socket cavity 232 may have other shapes in alternative embodiments. The socket frame 230 may include locating pins 234 configured to engage the interposer 300 to locate the socket connector 200 relative to the interposer 300. For example, the locating pins 234 are received in openings in the interposer 300 to position the socket contacts 202 for mating with the interposer 300.

The interposer 300 includes interposer contacts 302 arranged in an array. The interposer 300 includes an interposer substrate 310 holding the interposer contacts 302. In an exemplary embodiment, the interposer contacts 302 are arranged in a contact array along a surface 320 of the interposer substrate 310, such as along an upper surface of the interposer substrate 310.

The interposer substrate 310 extends between a front 324 of the interposer 300 and a rear 326 of the interposer 300. In an exemplary embodiment, the interposer substrate 310 includes an interposer circuit board 312. The interposer contacts 302 are circuits of the interposer circuit board 312. For example, the interposer contacts 302 are contact pads at the mating end of the interposer circuit board 312. The interposer contacts 302 have mating ends 304 at the front 324 of the interposer circuit board 312. The mating end 304 are configured to be mated with the corresponding socket contacts 202 of the socket connector 200. The interposer contacts 302 have terminating ends 306. In various embodiments, the terminating ends 306 are located proximate to the rear 326 of the interposer circuit board 312 for termination to the cable assembly 400. For example, conductors of the individual cables of the cable assembly 400 may be terminated directly to the terminating ends 306. In other various embodiments, contacts may be provided between the conductors of the individual cables and the terminating ends 306 of the interposer contacts 302. In various embodiments, some or all of the terminating ends 306 may be provided at the bottom of the interposer circuit board 312, such as for electrical connection to the host circuit board 110. In other various embodiments, the interposer substrate 310 is a molded part, such as a plate, holding an individual interposer contacts, such as stamped and formed contacts.

In an exemplary embodiment, the interposer 300 includes the interposer frame 330 holding the interposer substrate 310. The interposer frame 330 may hold the socket connector 200. The interposer frame 330 may support the cable assembly 400. For example, the cable assembly 400 may be coupled to the interposer frame 330. The interposer frame 330 includes rails 332 along opposite sides of the interposer frame 330. The interposer frame 330 includes end walls 334 extending between the rails 332. The rails 332 and the end walls 334 form a socket cavity 336 and an interposer cavity 338. The socket cavity 336 receives the socket connector 200. The interposer cavity 338 receives the interposer circuit board 312. The interposer cavity 338 is open to the socket cavity 336 to allow connection of the socket connector 200 to the interposer circuit board 312. The interposer frame 330 includes locating features, such as ledges, walls, tabs, pins, and the like for locating the socket connector 200 in the socket cavity 336 and the interposer circuit board 312 in the interposer cavity 338.

In an exemplary embodiment, the interposer frame 330 incudes locating pins 335 configured to engage the host circuit board 110 to locate the interposer 300 relative to the host circuit board 110. For example, the locating pins 335 are received in openings in the host circuit board 110 to position the interposer 300.

In an exemplary embodiment, the interposer frame 330 includes latching elements 340 configured to latchably couple to the pluggable module 104. In the illustrated embodiment, the latching elements 340 include latch pockets 342 that receive the latching fingers 572 of the latches 564, 566 of the latch device 560. The latching elements 340 include release elements 344 to release the latches 564, 566 from the latch pockets 342. The release elements 344 include ramps 346 in the illustrated embodiment. Other types of release elements may be used in alternative embodiments.

In an exemplary embodiment, the cable assembly 400 includes a plurality of cables 402 that extend into a cable housing 410. The cable housing 410 is coupled to the interposer 300, such as to the interposer frame 330 and/or the interposer circuit board 312. In various embodiments, the cable housing 410 may provide shielding for the cables 402. In an exemplary embodiment, the cables 402 are high-speed electrical cables. In various embodiments, the cables 402 are twinaxial cables having a pair of conductors 404 surrounded by an insulator 406 and a cable shield 408. The cable shield 408 provides electrical shielding for the conductors 404. The conductors 404 may be configured to transmit differential signals. Other types of cables may be used in alternative embodiments, such as coaxial cables, twisted-pair cables, or other types of cables. In other various embodiments, the cables 402 may be flexible circuits. In an exemplary embodiment, the cable assembly 400 includes a shielding structure at the interface between the ends of the cables 402 and the interposer 300. For example, the conductors 404 may be terminated to the terminating ends 306 in shielded pockets. For example, each of the cables 402 may be shielded from adjacent cables by the shielding structure.

In an exemplary embodiment, the interposer 300 includes contact assemblies 420 coupled to the interposer circuit board 312. The contact assemblies 420 includes contacts 422 configured to be coupled to the host circuit board 110. The contacts 422 may be low speed signal contacts and/or power contacts for transmitting low speed signals and/or power between the interposer circuit board 312 and the host circuit board 110. In an exemplary embodiment, the contact assemblies 420 include contact holders 424, such as overmolds, to hold the contacts 422 relative to each other, such as for assembly to the interposer circuit board 312. The contacts 422 may include compliant pins, such as press-fit pins for connection to the interposer circuit board 312 and/or the host circuit board 110.

The socket connector 200 and the interposer 300 form a very short electrical path between the pluggable module 104 and the cable assembly 400 to form a reliable over the board connector system to allow high-speed data communication between the pluggable module 104 and the electrical device 106. The components of the connector assembly 108 form a circuit stack. The socket contacts 202 of the socket connector 200 and the interposer contacts 302 of the interposer 300 are aligned/stacked for mating with the module contacts 548 of the pluggable module 104. For example, the interposer 300 is located below the socket connector 200 and the socket connector 200 is configured to receive the pluggable module 104 from above the socket connector 200. When mated, the socket contacts 202 form signal paths between the module contacts 548 and the interposer contacts 302. In an exemplary embodiment, the socket contacts 202 are compressible. For example, the socket contacts 202 may be compressed vertically between the pluggable module 104 and the interposer 300. In an exemplary embodiment, the loading mechanism 150 (FIG. 4) is used to load the contacts during mating. For example, the loading mechanism 150 may compress the socket contacts 202 in a contact mating direction (for example, vertically) to create reliable electrical paths through the socket connector 200.

Figure 8:
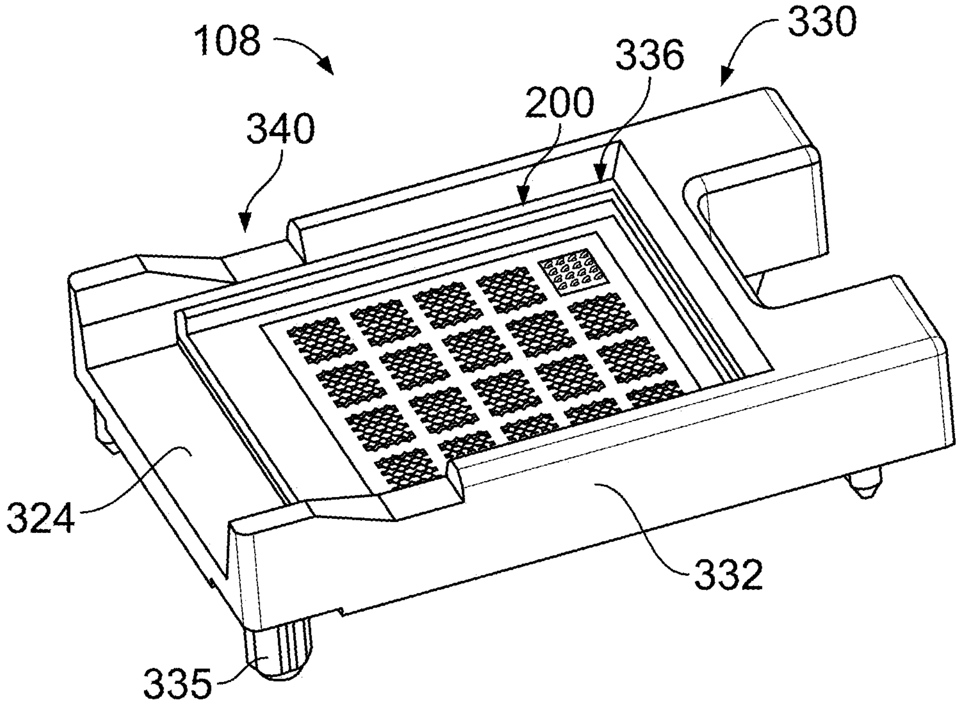
FIG. 8 is a perspective view of the connector assembly in accordance with an exemplary embodiment showing the socket connector and interposer connected together and held by the interposer frame.
Figure 9:
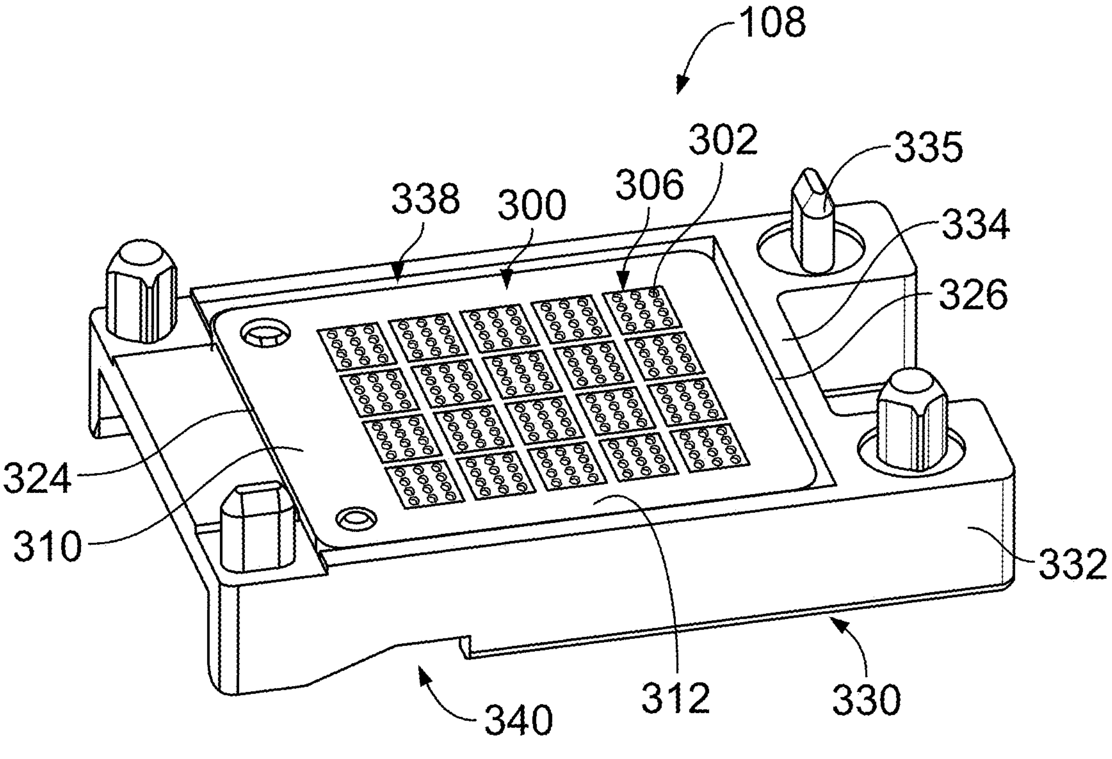
FIG. 9 is a bottom perspective view of the connector assembly in accordance with an exemplary embodiment showing the socket connector and interposer connected together and held by the interposer frame.
Figure 10:
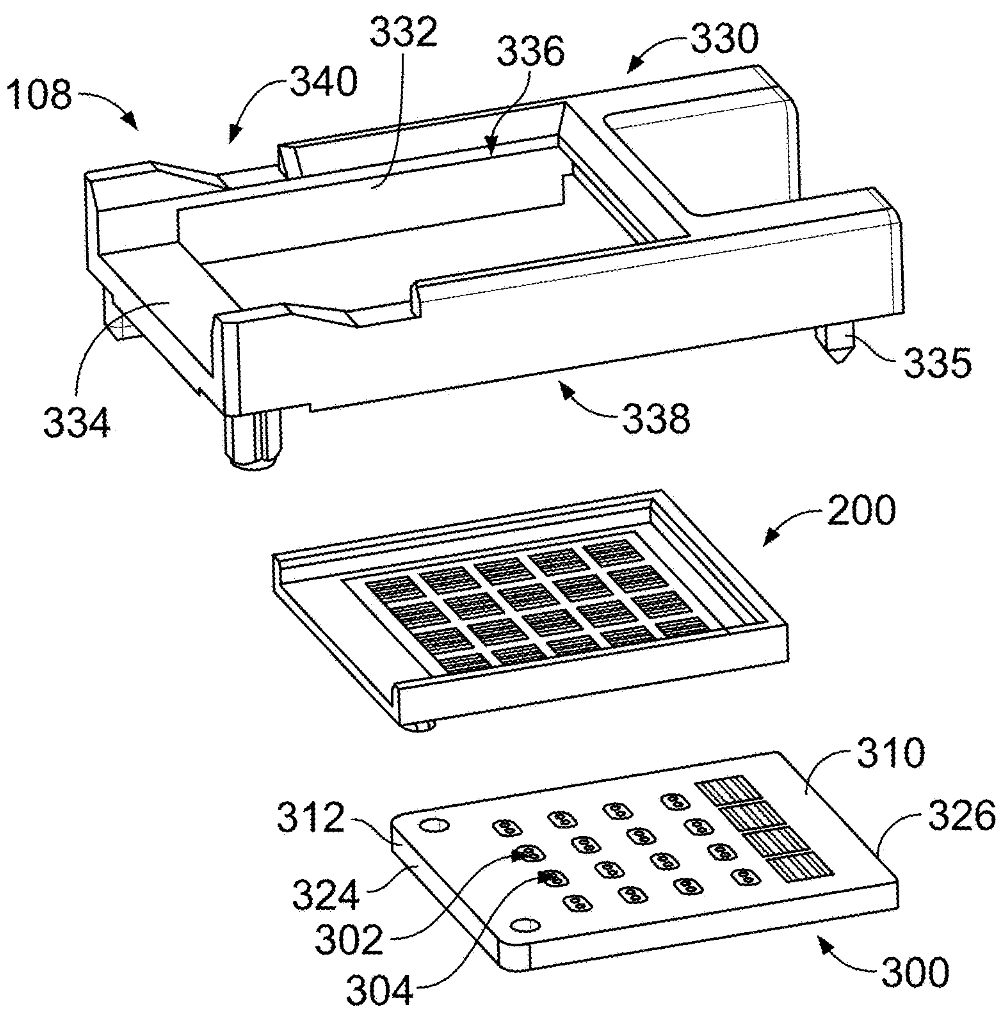
FIG. 10 is an exploded view of the connector assembly in accordance with an exemplary embodiment.

FIG. 8 is a perspective view of the connector assembly 108 in accordance with an exemplary embodiment showing the socket connector 200 and interposer 300 connected together and held by the interposer frame 330. FIG. 9 is a bottom perspective view of the connector assembly 108 in accordance with an exemplary embodiment showing the socket connector 200 and interposer 300 connected together and held by the interposer frame 330. FIG. 10 is an exploded view of the connector assembly 108 in accordance with an exemplary embodiment. The connector assembly 108 shown in FIGS. 8-10 is similar to the connector assembly 108 shown in FIGS. 5-7; however, the connector assembly 108 shown in FIGS. 8-10 is configured to be coupled to the host circuit board 110 rather than the cable assembly 400 (FIGS. 5-7). The connector assembly 108 shown in FIGS. 8-10 is shaped differently because the interposer 300 does not need to accommodate the cable assembly 400. The socket connector 200 may be identical to the socket connector 200 shown in FIGS. 5-7.

The interposer 300 includes the interposer contacts 302 arranged in an array. The interposer substrate 310 holds the interposer contacts 302. The interposer substrate 310 extends between the front 324 and the rear 326 of the interposer 300. The interposer substrate 310 includes the interposer circuit board 312, which forms the interposer contacts 302. The interposer contacts 302 have the mating ends 304 and the terminating ends 306. The mating ends 304 are arranged at the top surface of the interposer substrate 310. The terminating ends 306 are arranged at the bottom surface of the interposer substrate 310. The interposer contacts 302 pass through the interposer circuit board 312, such as straight through the interposer circuit board 312. The interposer contacts 302 may include plated vias between the mating ends 304 and the terminating ends 306. The interposer contacts 302 may include circuit pads at the mating ends 304 and/or the terminating ends 306. In the illustrated embodiment, the interposer contacts 302 include solder balls at the termination ends 306 configured to be soldered to board contacts of the host circuit board 110.

In an exemplary embodiment, the interposer 300 includes the interposer frame 330 holding the interposer circuit board 312 and the socket connector 200. The interposer frame 330 includes the rails 332 along the sides of the interposer frame 330 and the end walls 334 between the rails 332. The rails 332 are shorter in the embodiment shown in FIGS. 8-10 compared to the embodiment shown in FIGS. 5-7. The socket cavity 336 may be identical in the embodiments to receive the socket connector 200. The interposer cavity 338 may be sized and shaped differently to receive the different shaped interposer circuit boards 312. The locating pins 335 may be similar in the various embodiments. The latching elements 340 may be similar in the various embodiments.

Figure 11:
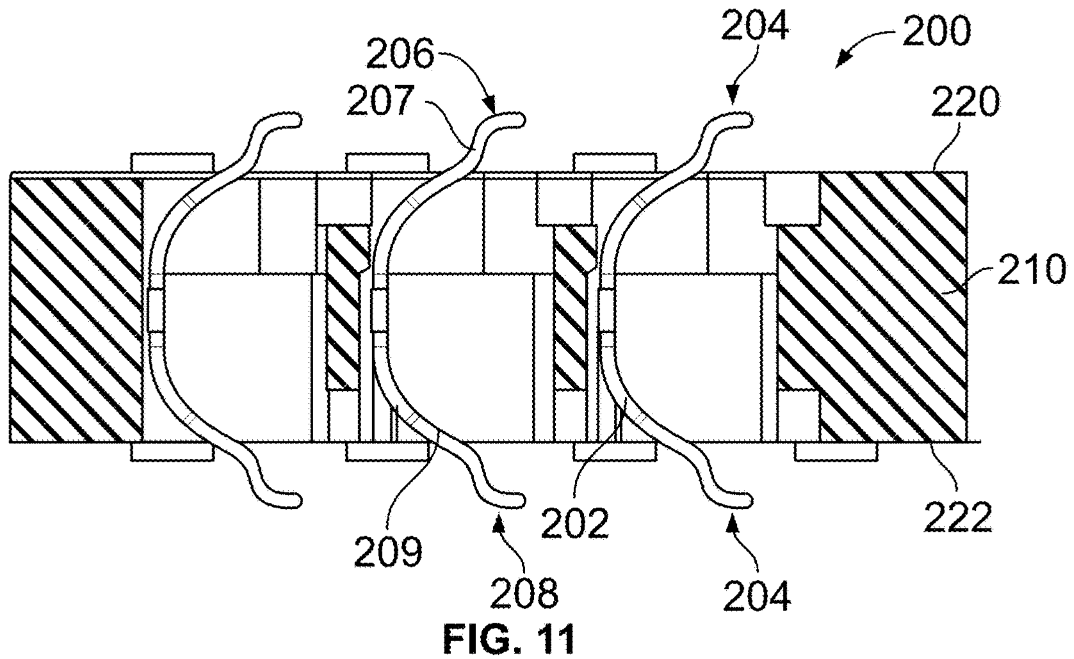
FIG. 11 is a cross sectional view of a portion of the socket connector in accordance with an exemplary embodiment.

FIG. 11 is a cross sectional view of a portion of the socket connector 200. FIG. 11 shows a plurality of the socket contacts 202 held in the socket substrate 210. The socket contacts 202 are held in the contact channels 212 (FIG. 6). The mating ends 204 of the socket contacts 202 are arranged at the top and the bottom for mating with the pluggable module 104 and the interposer 300, respectively.

In the illustrated embodiment, the socket contacts 202 include an upper contact array of upper contacts 206 and a lower contact array of lower contacts 208. The mating ends 204 of the upper contacts 206 include spring beams 207 and the mating ends 204 of the lower contacts 208 include spring beams 209. The spring beams 207, 209 are deflectable and are configured to be mated with the module contacts of the pluggable module 104 and the interposer contacts 302, respectively.

In an exemplary embodiment, the socket contacts 202 are stamped and formed contacts. The socket contacts 202 are loaded into the contact channels 212 of the socket substrate 210. In an exemplary embodiment, the socket substrate 210 is a molded part, such as a plastic frame having the contact channels 212. The upper contacts 206 are provided at the upper surface 220 of the socket substrate 210. The lower contacts 208 are provided at the lower surface 222 of the socket substrate 210. The socket contacts 202 may include both signal contacts and ground contacts. Optionally, the signal contacts may be arranged in pairs with ground contacts interspersed between the pairs of the signal contacts. Other arrangements are possible in alternative embodiments.

Figure 13:
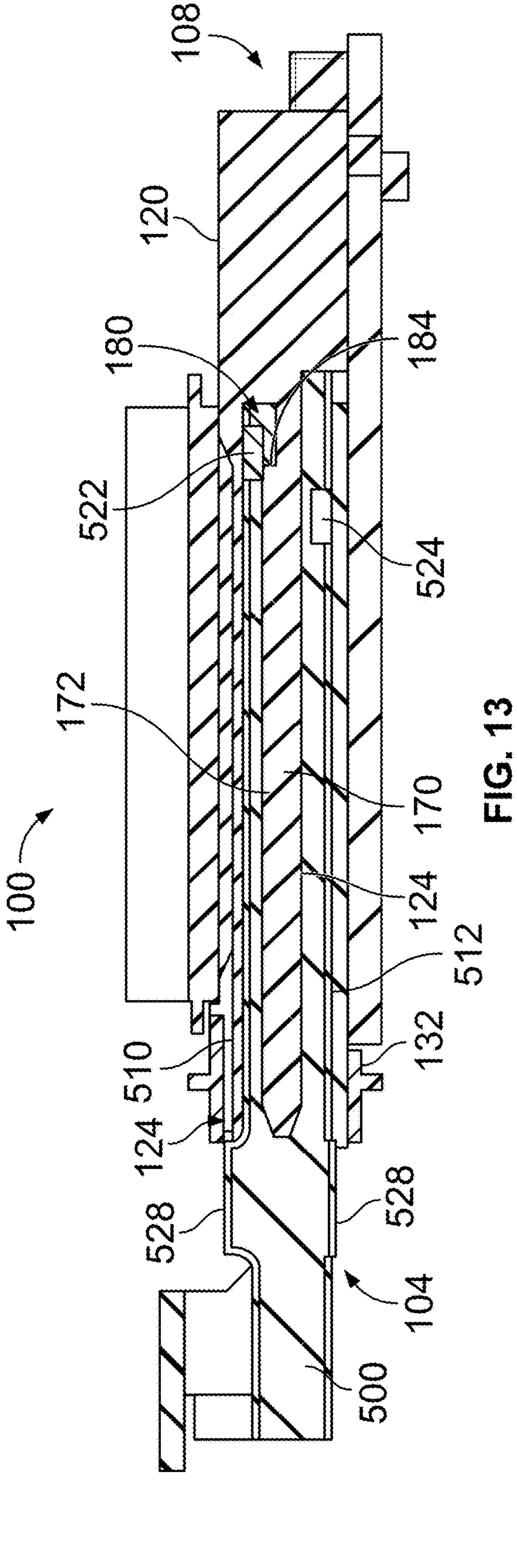
FIG. 13 is a side view of the electrical connector system showing the pluggable module partially loaded into the cage in the module loading direction in accordance with an exemplary embodiment.
Figure 14:
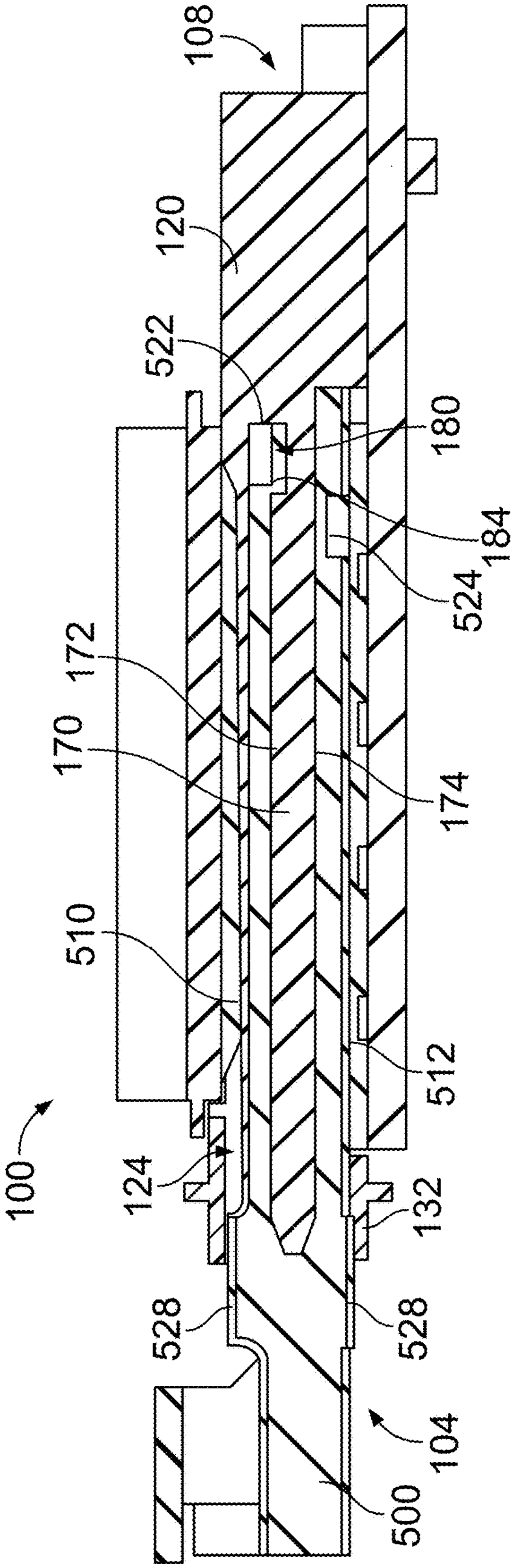
FIG. 14 is a side view of the electrical connector system showing the pluggable module fully loaded into the cage in the module loading direction prior to mating the pluggable module with the connector assembly in the contact mating direction in accordance with an exemplary embodiment.
Figure 15:
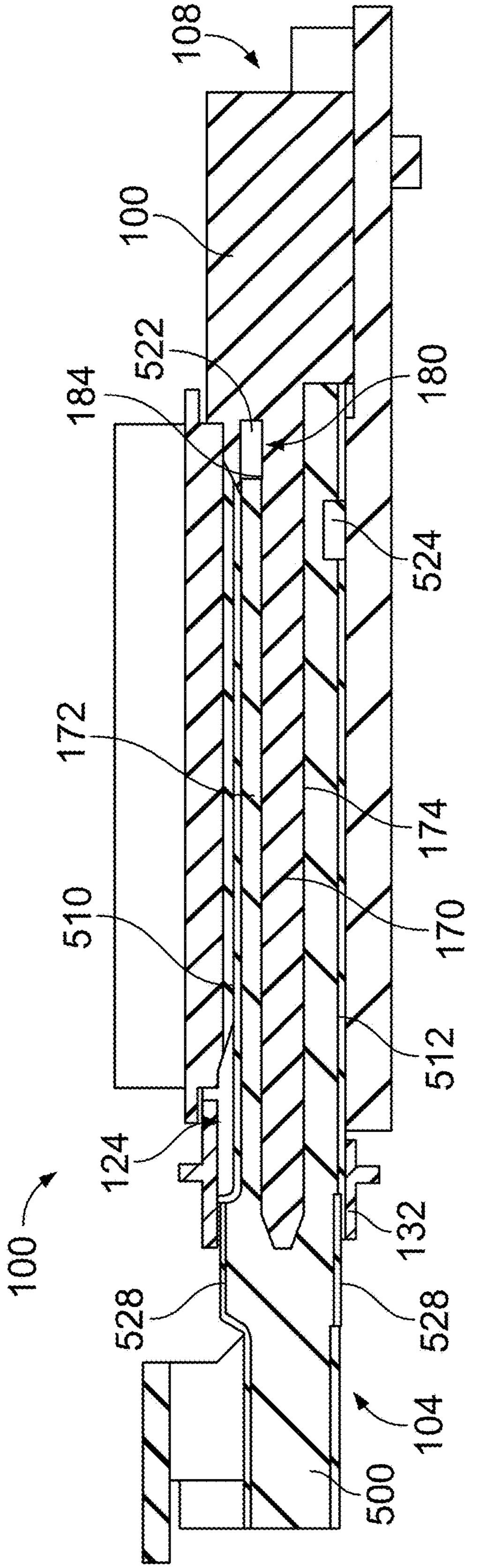
FIG. 15 is a side view of the electrical connector system showing the pluggable module mated with the connector assembly in the contact mating direction in accordance with an exemplary embodiment.

FIG. 12 is a side view of the electrical connector system 100 showing the pluggable module 104 initially loaded into the cage 120. FIG. 13 is a side view of the electrical connector system 100 showing the pluggable module 104 partially loaded into the cage 120 in the module loading direction. FIG. 14 is a side view of the electrical connector system 100 showing the pluggable module 104 fully loaded into the cage 120 in the module loading direction prior to mating the pluggable module 104 with the connector assembly 108 in the contact mating direction. FIG. 15 is a side view of the electrical connector system 100 showing the pluggable module 104 mated with the connector assembly 108 in the contact mating direction.

When initially loaded (FIG. 12), the mating end of the pluggable module 104 is loaded into the module channel 124 at the front of the cage 120. The guide lugs 522, 524 engage the guide rails 170 to guide loading of the pluggable module 104 into the module channel 124. For example, the upper guide lug 522 is located above the upper ledge 172 and the lower guide lug 524 is located below the lower ledge 174. The guide rail 170 is located in the gap 526 between the guide lugs 522, 524. The guide rail 170 holds the vertical position of the pluggable module 104 in the module channel 124. The upper ledge 172 prevents downward movement of the pluggable module 104 in the module channel 124. The lower ledge 172 prevents upward movement of the pluggable module 104 in the module channel 124.

During loading, the pluggable module 104 is slid horizontally along the guide rail 170. For example, the upper guide lug 522 slides along the upper ledge 172 and/or the lower guide lug 524 slides along the lower ledge 174 in the module loading direction (to the right in the orientation shown in FIG. 13). In an exemplary embodiment, the guide rail 170 holds the pluggable module 104 at an elevated position where the bottom 512 of the pluggable module 104 is held spaced apart from the bottom wall 132 of the cage 120. In the elevated position, the mating end 505 is able to be moved into position stacked over (for example, above) the connector assembly 108, such as above the socket connector 200. In an exemplary embodiment, in the elevated position, the bottom of the module circuit board 502 may be maneuvered to the location above the socket connector 200 without mating engagement with the socket contacts 202. For example, the bottom of the module circuit board 502 may be held above the socket contacts 202 to avoid wiping along the socket contacts 202 as the module circuit board 502 is moved to the fully loaded position (FIG. 14).

When loaded, the embossments 528 at the rear of the pluggable module 104 are eventually loaded into the module channel 124. The embossments 528 are used to locate the pluggable module 104 in the cage 120. For example, the embossments 528 are configured to engage the cage 120 to vertically position the rear end of the pluggable module 104 in the cage 120. The embossment 528 at the top 510 is used to hold the top 510 of the module body 500 spaced apart from the top of the cage 120. The embossments 528 may be used to engage with EMI features in the cage (not shown) to provide an EMI seal. The embossment 528 at the bottom 512 is used to hold the bottom 512 of the module body 500 spaced apart from the bottom of the cage 120. Other types of locating features may be provided in alternative embodiments to position the module body 500 relative to the cage 120.

When fully loaded (FIG. 14) in the module loading direction, the upper guide lug 522 is aligned with the drop pocket 180. The upper guide lug 522, and the mating end 505, is configured to be moved downward in the contact mating direction to the mated position (FIG. 15). The module contacts 548 at the bottom of the module circuit board 502 is moved downward into engagement with the socket contacts 202 of the socket connector 200. The module circuit board 502 compresses the socket contacts 202 when moved in the contact mating direction. The module circuit board 502 is used to compress the socket contacts 202 in mating engagement with the interposer contacts 302 of the interposer 300. In the mated position, the upper guide lug 522 is located in the drop pocket 180. The upper guide lug 522 engages the stop shoulder 184 to position the pluggable module 104 relative to the cage 120 and the connector assembly 108. For example, the module contacts 548 are aligned with the corresponding socket contacts 202.

Figure 16:
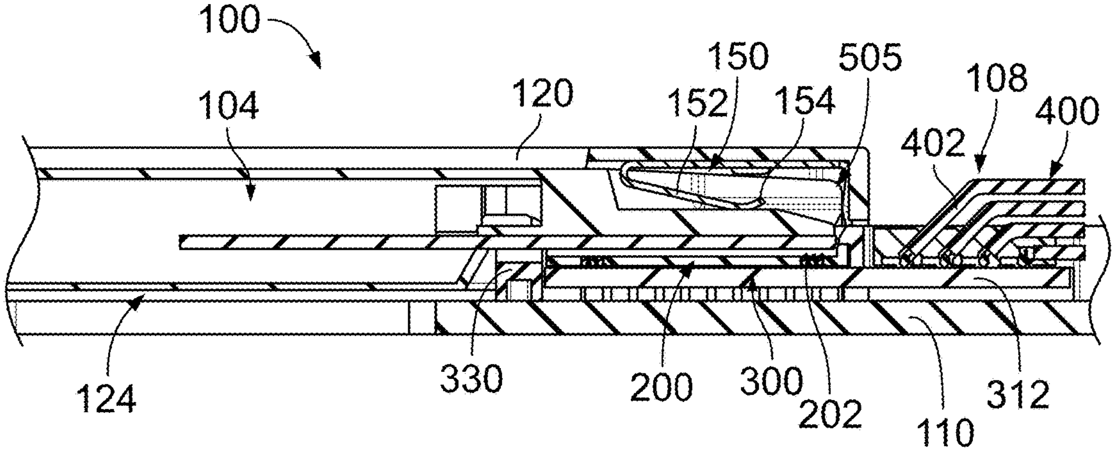
FIG. 16 is a side view of a portion of the electrical connector system showing the pluggable module in a fully loaded position but an unmated state in accordance with an exemplary embodiment.
Figure 17:
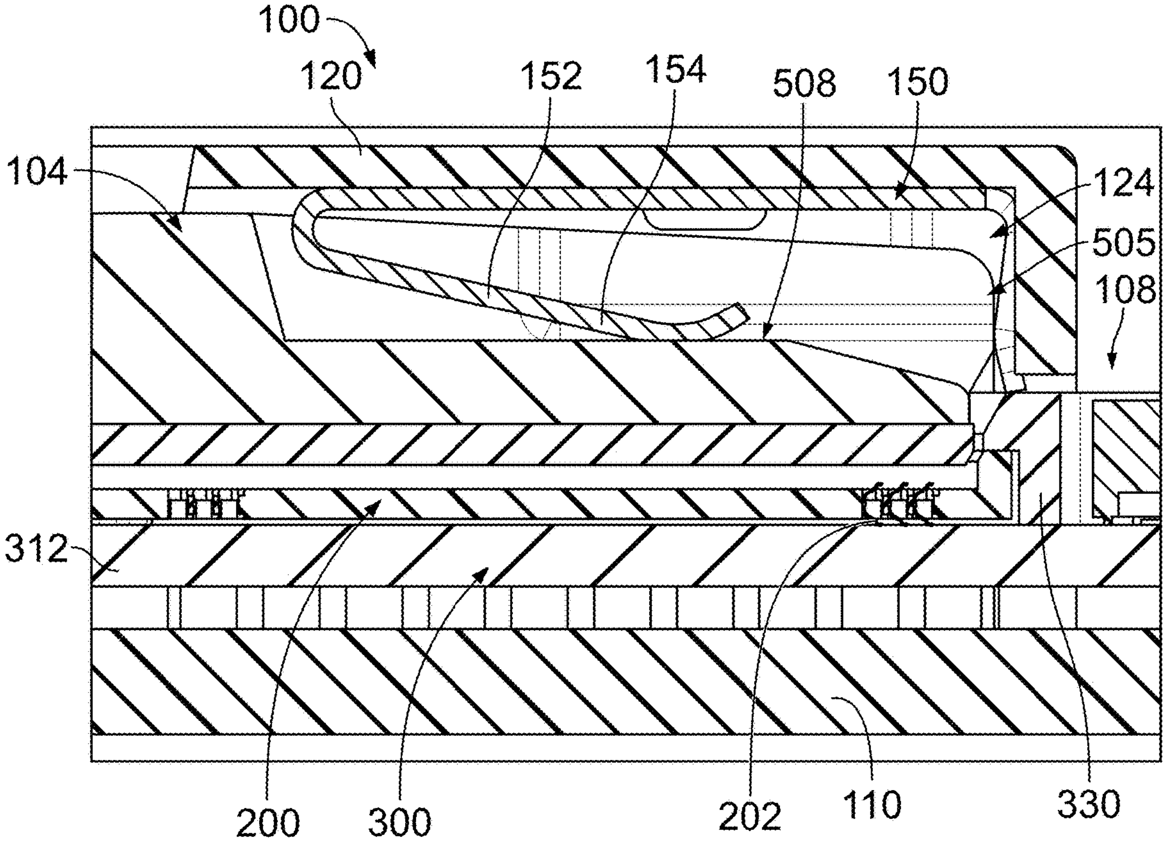
FIG. 17 is an enlarged view of a portion of the electrical connector system shown in FIG. 16 in accordance with an exemplary embodiment.
Figure 18:
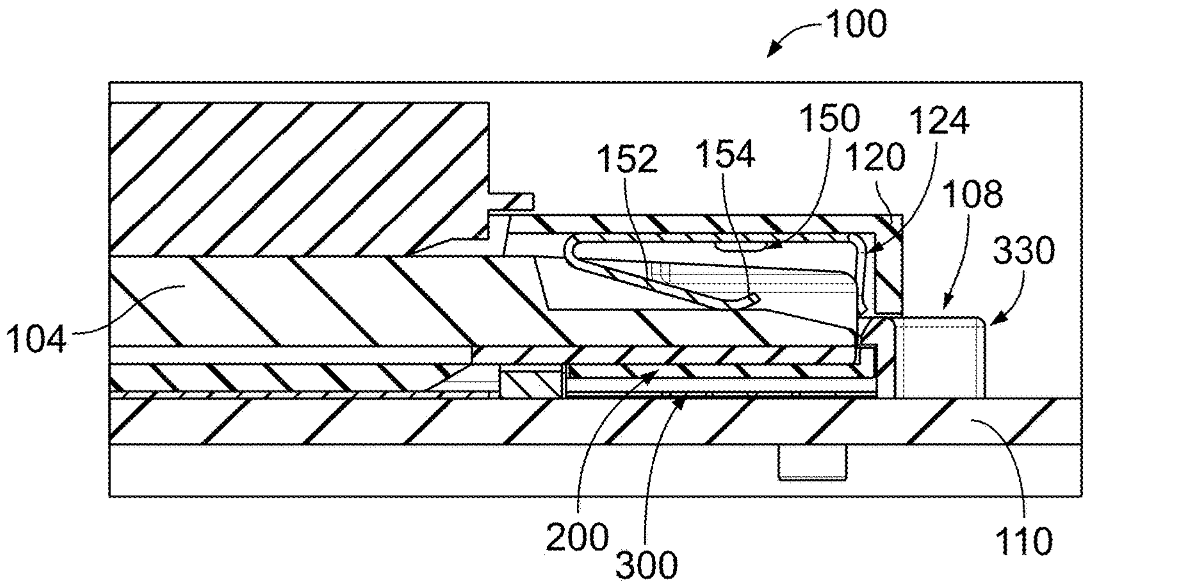
FIG. 18 is a side view of a portion of the electrical connector system showing the pluggable module in a fully loaded position and a mated state in accordance with an exemplary embodiment.
Figure 19:
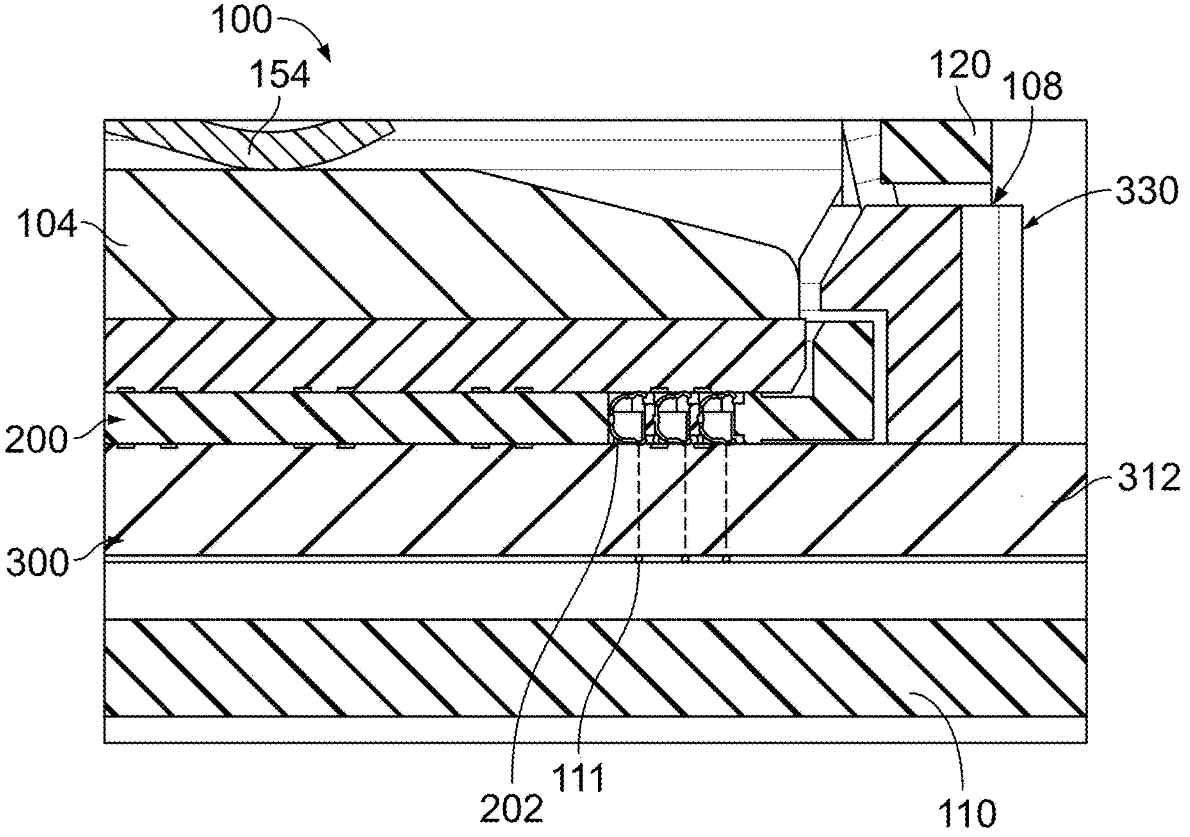
FIG. 19 is an enlarged view of a portion of the electrical connector system shown in FIG. 18 in accordance with an exemplary embodiment.

FIG. 16 is a side view of a portion of the electrical connector system 100 showing the pluggable module 104 in a fully loaded position but an unmated state (For example, corresponding to FIG. 14). FIG. 17 is an enlarged view of a portion of the electrical connector system 100 shown in FIG. 16. FIG. 18 is a side view of a portion of the electrical connector system 100 showing the pluggable module 104 in a fully loaded position and a mated state (for example, corresponding to FIG. 15). FIG. 19 is an enlarged view of a portion of the electrical connector system 100 shown in FIG. 18.

During mating, the mating end 505 of the pluggable module 104 is loaded into the module channel 124 of the cage 120 in the module loading direction to align the mating end 505 with the connector assembly 108 (FIGS. 16 and 17). The mating end 505 engages the loading mechanism 150 when loaded into the module channel 124. For example, the first spring arm 154 of the load spring 152 engages the actuation feature 508 (for example, the ramp) at the mating end 505. The first spring arm 154 presses downward on the top of the pluggable module 104 to move the pluggable module 104 in the downward contact mating direction when the guide lug 522 is aligned with the drop pocket 180 to the mated position (FIGS. 18 and 19).

In an exemplary embodiment, the pluggable module 104 is moved downward in the contact mating direction by the loading mechanism 150 to mate the pluggable module 104 with the socket connector 200. In an exemplary embodiment, the socket connector 200 may be pressed downward and mated with the interposer 300 by the loading mechanism 150. For example, as the pluggable module 104 moves downward, the pluggable module 104 moves the socket connector 200 downward to mate with the interposer 300. The socket contacts 202 are compressed between the pluggable module 104 and the interposer 300. When mated, the socket contacts 202 form signal paths between the pluggable module 104 and the interposer 300. The socket connector 200 and the interposer 300 form a very short electrical path between the pluggable module 104 and the cable assembly 400 to form a reliable over the board connector system to allow high-speed data communication between the pluggable module 104 and the electrical device 106.

In the illustrated embodiment, FIGS. 16 and 17 show the interposer 300 as a cable terminated interposer, wherein the cables 402 of the cable assembly 400 are terminated to the interposer circuit board 312. The cables 402 may be routed over the (host circuit) board to a remote location. The cables 402 may be used for high-speed signaling, wherein the signals may be shielded for improved signal performance and signal integrity compared to routing the signal lines through the host circuit board 110. In the illustrated embodiment, FIGS. 18 and 19 show the interposer 300 as a board terminated interposer rather than the cable terminated interposer. The board terminated interposer 300 is electrically connected to the host circuit board 110 rather than being terminated to the cables 402 of the cable assembly 400. The signal lines are routed along traces through the host circuit board 110, which may be less expensive than utilizing the cable assembly 400.

In an exemplary embodiment, the board terminated interposer and the cable terminated interposer are direct replacements for each other within the system. For example, the electrical connector system 100 may be used interchangeably with the board terminated interposer or the cable terminated interposer. For example, the board terminated interposer and the cable terminated interposer may have similar sizes, shapes, and contact arrangements such that either of the interposers may be plugged into the cage 120 to mate with the socket connector 200. The front end of the interposer frames 330 on both versions may be identical, such as to receive the same socket connectors 200 and for mating with the same pluggable modules 104. The changes include lengthening the rear end of the interposer frame 330 on the cable version to accommodate the longer interposer circuit board 312 and the cable assembly 400.

In an exemplary embodiment, the host circuit board 110 may include board contacts 111 (FIG. 19) at the mounting area for mating with the board terminated interposer (FIGS. 18 and 19). The board contacts 111 may be formed by circuits of the host circuit board 110. For example, the board contacts 111 may be contact pads, traces, vias, and the like of the host circuit board 110. The board contacts 111 are arranged in an array similar to the array of the interposer contacts and the socket contacts. The interposer 300 is electrically connected to the host circuit board 110 at the board contacts 111. Power and/or signals may be transmitted between the host circuit board 110 and the interposer 300. The electrical device 106 is electrically connected to the pluggable module 104 through the circuits of the host circuit board 110, through the interposer 300 and through the socket connector 200.

Figure 20:
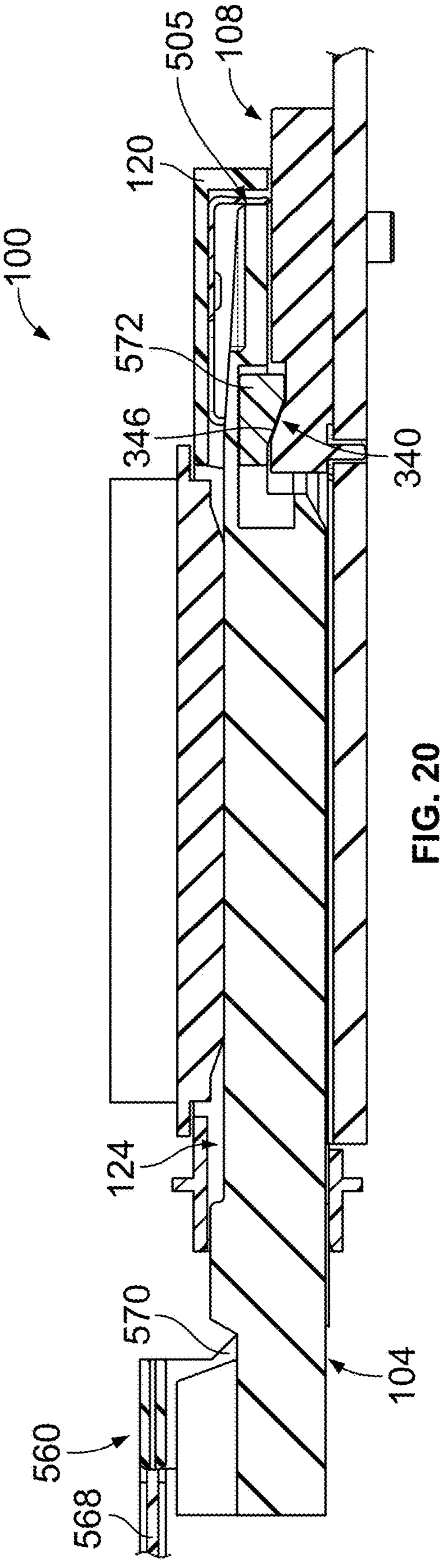
FIG. 20 is a side view of the electrical connector system showing the pluggable module fully loaded into the cage and mated with the connector assembly with the latching device engaging the latching element in accordance with an exemplary embodiment.
Figure 21:
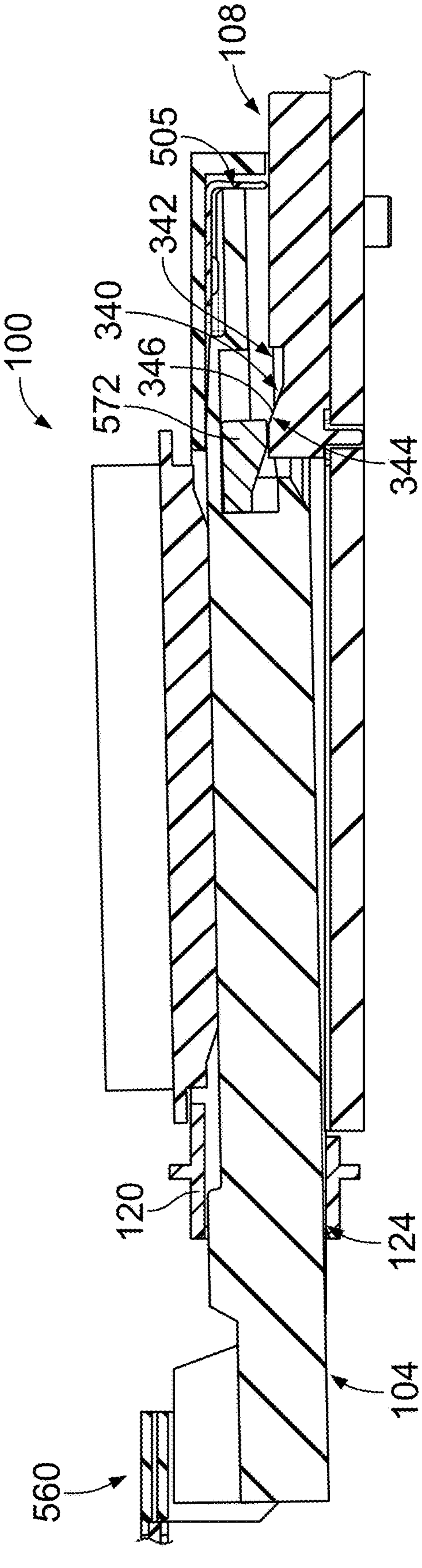
FIG. 21 is a side view of the electrical connector system showing the pluggable module partially unmated from the connector assembly with the latching device released from the latching element in accordance with an exemplary embodiment.

FIG. 20 is a side view of the electrical connector system 100 showing the pluggable module 104 fully loaded into the cage 120 and mated with the connector assembly 108 with the latching device 560 engaging the latching element 340. FIG. 21 is a side view of the electrical connector system 100 showing the pluggable module 104 partially unmated from the connector assembly 108 with the latching device 560 released from the latching element 340.

When latched, the latching fingers 572 are received in the latch pockets 342. The latching elements 340 retain the latching fingers 572 to prevent unmating of the pluggable module 104 from the connector assembly 108. The latching elements 340 prevent rearward movement of the pluggable module 104. The latching device 560 may be released by pulling rearward on the release tab 568, which pulls the latch arms 570 and the latching fingers 572 rearward. The latching fingers 572 slide along the ramps 346 of the release elements 344 to lift the mating end 505 of the pluggable module 104 upward to unmate the pluggable module 104 from the connector assembly 108. The upward movement of the pluggable module 104 lifts the guide lugs 522, 524 out of the drop pockets 180, which allows the pluggable module 104 to be pulled in a rearward direction to remove the pluggable module 104 from the module channel 124.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. An electrical connector system comprising:

a circuit card assembly including a host circuit board, an interposer, and a socket connector arranged in a circuit stack, the interposer including an interposer circuit board having interposer contacts, the interposer contacts having mating ends and terminating ends opposite the mating ends, the socket connector including socket contacts, the socket contacts being compressible, the socket contacts having first mating ends and second mating ends, the first mating ends having separable mating interfaces at a module mating zone, the second mating ends having mating interfaces, the second mating ends being connected to the mating ends of the corresponding interposer contacts;

a pluggable module including a module body having a top and a bottom, the pluggable module having a mating end, the pluggable module including a module circuit board held by the module body at the mating end, the mating end configured to be loaded into the module mating zone in a module loading direction such that the module circuit board is aligned with the circuit stack, the module circuit board having module contacts mated with the corresponding first mating ends of the socket contacts in a contact mating direction generally perpendicular to the module loading direction to compress the socket contacts between the module circuit board and the interposer contacts and create circuit paths between the module contacts and the interposer contacts through the socket contacts.

2. The electrical connector system of claim 1, wherein the module loading direction is generally parallel to the host circuit board and the contact mating direction is generally perpendicular to the host circuit board.

3. The electrical connector system of claim 1, wherein the circuit card assembly includes a cage mounted to the circuit board, the cage having shielding walls forming a module channel with a port at a front of the cage to access the module channel, the circuit stack located at a rear of the cage, the mating end of the pluggable module being loaded into the module channel through the port in the module loading direction, the mating end of the pluggable module being movable relative to the cage in the contact mating direction to force mating of the module contacts with the socket contacts in the contact mating direction.

4. The electrical connector system of claim 3, wherein the cage includes guide rails extending between the front and the rear of the cage, the guide rails guiding the pluggable module in the module loading direction, the guide rails including drop pockets allowing the mating end of the pluggable module to drop downward in the contact mating direction when the mating end is aligned with the module mating zone to mate the module contacts with the socket contacts.

5. The electrical connector system of claim 1, further comprising a loading mechanism operably coupled to the circuit card assembly, the loading mechanism being operated to press the mating end of the pluggable module in the contact mating direction to compress the socket contacts between the module circuit board and the interposer contacts to create the circuit paths.

6. The electrical connector system of claim 5, wherein the loading mechanism includes a spring arm configured to engage a top of the module body to press the pluggable module downward in the contact mating direction.

7. The electrical connector system of claim 1, wherein the socket connector includes an upper surface, the first mating ends of the socket contacts being exposed on the upper surface for mating with the module contacts of the module circuit board in the contact mating direction.

8. The electrical connector system of claim 1, wherein the pluggable module includes at least one communication cable extending from a cable end of the module body, the at least one communication cable comprising at least one fiber optic cable or the at least one high-speed electrical cable, the module contacts being communicatively coupled to the at least one communication cable.

9. The electrical connector system of claim 1, wherein the terminating ends of the interposer contacts are electrically connected to board contacts of the host circuit board, the socket contacts being electrically connected to the host circuit board through the interposer contacts.

10. The electrical connector system of claim 1, wherein the module circuit board is vertically aligned with the circuit stack with the socket connector located between the module circuit board and the interposer, the module contacts being aligned vertically above the socket contacts and the socket contacts being aligned vertically above the interposer contacts.

11. The electrical connector system of claim 1, wherein the interposer circuit board includes an upper surface extending between a front and a rear, the mating ends of the interposer contacts defined by contact pads in an array on the upper surface at the front, the terminating ends of the interposer contacts defined by contact pads in an array on the upper surface at the rear.

12. The electrical connector system of claim 11, further comprising a cable assembly having cables electrically connected to corresponding terminating ends of the interposer contacts, the cables being electrically connected to the socket connector through the interposer contacts.

13. The electrical connector system of claim 1, wherein the socket contacts include deflectable spring fingers at the first mating ends and the second mating ends, the deflectable spring fingers being compressed between the module contacts and the interposer contacts.

14. An electrical connector system comprising:

a circuit card assembly including a host circuit board, a cage mounted to the host circuit board, a socket connector received in the cage, and an interposer received in the cage;

the cage having shielding walls forming a module channel extending between a front and a rear of the cage, the cage configured to receive a pluggable module in the module channel in a module loading direction, the interposer and the socket connector arranged in a circuit stack at a module mating zone at the rear of the cage for mating with the pluggable module at the module mating zone, wherein the cage is configured to allow mating of the pluggable module with the circuit stack in a contact mating direction generally perpendicular to the module loading direction;

the interposer including an interposer circuit board having interposer contacts, the interposer contacts having mating ends and terminating ends opposite the mating ends;

the socket connector including socket contacts, the socket contacts being compressible, the socket contacts having first mating ends and second mating ends, the first mating ends having separable mating interfaces configured to mate with module contacts of the pluggable module in the contact mating direction to compress the socket contacts, the second mating ends having mating interfaces, the second mating ends being connected to the mating ends of the corresponding interposer contacts.

15. The electrical connector system of claim 14, wherein the cage includes guide rails extending between the front and the rear of the cage, the guide rails configured to guide the pluggable module in the module loading direction, the guide rails including drop pockets allowing a mating end of the pluggable module to drop downward in the contact mating direction when the mating end is aligned with the module mating zone to mate the module contacts with the socket contacts.

16. The electrical connector system of claim 14, further comprising a loading mechanism operably coupled to the circuit card assembly, the loading mechanism configured to press a mating end of the pluggable module in the contact mating direction to compress the socket contacts between the module circuit board and the interposer contacts to create the circuit paths.

17. The electrical connector system of claim 14, wherein the interposer circuit board includes an upper surface extending between a front and a rear, the mating ends of the interposer contacts defined by contact pads in an array on the upper surface at the front, the terminating ends of the interposer contacts defined by contact pads in an array on the upper surface at the rear, wherein a cable assembly having cables are electrically connected to corresponding terminating ends of the interposer contacts, the cables being electrically connected to the socket connector through the interposer contacts.

18. An electrical connector system comprising:

a circuit card assembly including a host circuit board and a connector assembly forming a circuit stack, the connector assembly including a socket connector, the socket connector including socket contacts, the socket contacts being compressible, the socket contacts having first mating ends and second mating ends, the first mating ends having separable mating interfaces at a module mating zone, the second mating ends having mating interfaces;

a pluggable module including a module body having a top and a bottom, the pluggable module having a mating end, the pluggable module including a module circuit board held by the module body at the mating end, the mating end configured to be loaded into the module mating zone in a module loading direction such that the module circuit board is aligned with the circuit stack, the module circuit board having module contacts mated with the corresponding first mating ends of the socket contacts in a contact mating direction generally perpendicular to the module loading direction to compress the socket contacts and create circuit paths between the module contacts and the socket contacts, wherein the module loading direction is generally parallel to the host circuit board and the contact mating direction is generally perpendicular to the host circuit board, and wherein the connector assembly includes an interposer, the interposer including an interposer circuit board having interposer contacts, the interposer contacts having mating ends and terminating ends opposite the mating ends, the mating ends being connected to the second mating ends of the corresponding socket contacts.

* * * * *